(12) United States Patent
Khaund

(10) Patent No.: US 11,985,138 B2
(45) Date of Patent: *May 14, 2024

(54) SYSTEMS AND METHODS FOR PROCESSING OPTIMIZATIONS AND TEMPLATING USING METADATA-DRIVEN BLOCKCHAIN TECHNIQUES

(71) Applicant: Live Nation Entertainment, Inc., Beverly Hills, CA (US)

(72) Inventor: Sanzib Khaund, Walnut Creek, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,220

(22) Filed: Apr. 20, 2023

(65) Prior Publication Data
US 2023/0344835 A1   Oct. 26, 2023

Related U.S. Application Data

(63) Continuation of application No. 16/869,997, filed on May 8, 2020, now Pat. No. 11,665,172.

(60) Provisional application No. 62/846,381, filed on May 10, 2019.

(51) Int. Cl.
| | |
|---|---|
| *H04L 9/40* | (2022.01) |
| *G06F 16/23* | (2019.01) |
| *H04L 67/61* | (2022.01) |
| *G06N 20/00* | (2019.01) |

(52) U.S. Cl.
CPC ........ *H04L 63/105* (2013.01); *G06F 16/2379* (2019.01); *H04L 67/61* (2022.05); *G06N 20/00* (2019.01)

(58) Field of Classification Search
CPC .... H04L 63/105; H04L 67/61; G06F 16/2379
USPC .......................................................... 726/4
See application file for complete search history.

(56) References Cited

U.S. PATENT DOCUMENTS

| | | | |
|---|---|---|---|
| 9,760,574 B1* | 9/2017 | Zhai | G06F 3/061 |
| 11,297,069 B2* | 4/2022 | McBride | G06F 16/27 |
| 11,658,985 B2* | 5/2023 | McBride | H04L 61/4511 |
| | | | 709/203 |

OTHER PUBLICATIONS

ASCAR: Automating contention management for high-performance storage systems, Li et al., Jun. 2015 (Year: 2015).*

* cited by examiner

*Primary Examiner* — Jahangir Kabir
(74) *Attorney, Agent, or Firm* — MUGHAL GAUDRY & FRANKLIN PC

(57) ABSTRACT

The present disclosure generally relates to Blockchain-based systems configured to process access rights to resources in a computationally efficient manner. Certain embodiments of the present disclosure generally relate to systems and methods that generate distributed applications to represent digital access rights to resources. Additionally, certain embodiments of the present disclosure generally relate to systems and methods that enhance the processing of assigning access rights using a Blockchain-based system using metadata.

20 Claims, 18 Drawing Sheets

SYSTEMS AND METHODS FOR PROCESSING OPTIMIZATIONS AND TEMPLATING USING METADATA-DRIVEN BLOCKCHAIN TECHNIQUES

CLAIM FOR PRIORITY

This application is a continuation of U.S. patent application Ser. No. 16/869,997, filed May 8, 2020, which claims the priority benefit of U.S. Provisional Patent Application No. 62/846,381, filed May 10, 2019, the disclosures of which are incorporated by reference in their entirety for all purposes.

TECHNICAL FIELD

The present disclosure generally relates to using Blockchain techniques to manage access rights to resources. Certain embodiments of the present disclosure generally relate to systems and methods that create Blockchain distributed applications to represent access rights to a resource. Additionally, certain embodiments of the present disclosure generally relate to systems and methods that enhance the computational efficiency of executing the distributed applications on a Blockchain system using metadata associated with the distributed applications.

BACKGROUND

Blockchain-based systems are not designed for high-throughput. For instance, confirming a transaction with minimal latency can be difficult. For high-latency transactions like property deeds or digital-right management of media, this latency may not be an impediment. However, accessing resources using digital access rights can involve high-volume transactions. In addition, the processing load for accessing resources tends to burst at various times, such as the moment access rights are initially available for assignment to users. These bursts of processing load are computationally burdensome on the Blockchain-based systems.

Further, unlike other Blockchain-based systems where every transaction is treated equally, Blockchain-related transactions involve in accessing resources using digital access rights are heavily dependent on context. For example, the urgency of the transaction may depend on the nature of the operation, the characteristics of the access right, the identity of the user to which the access right is assigned, or the characteristics of the resource itself. This context, however, is not evaluated, and thus, prioritizing certain Blockchain-based transactions is a technical challenge.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

The assignment of access rights to resources is often managed by a centralized server hosted by a primary load management system. Each access right corresponds to a unique access code that grants access to the resource during a defined time period. The unique access codes are typically stored at the centralized server. When the primary load management system assigns an access right to a user, the centralized server can store features characterizing the user. However, if that user reassigns the access right to another user, the centralized server loses track of who is currently assigned to the access right. Without information indicating which user is authorized to access the resource, resources are more susceptible to unauthorized access by bad actors. Additionally, storing all of the unique access codes at the centralized server may not be secure and may be prone to hacking or other unauthorized access.

Recently, however, Blockchain technology has gained popularity for the enhanced security the technology provides to various applications. Blockchain provides a decentralized approach to verifying the authenticity of information, including data representing transactions. Certain embodiments of the present disclosure relate to systems and methods that convert access rights into secure digital assets protected by cryptographic public/private keys. As only a non-limiting example, a secure digital asset may be a smart contract. The converted access rights (i.e., the secure digital assets) can then be published on a Blockchain (e.g., posted to a public ledger on a Blockchain, such as an Ethereum Blockchain). Advantageously, creating a public ledger enables the primary load management system to track the ownership of an access right throughout the lifecycle of the access right. Further, by structuring access rights as secure digital assets, such as smart contracts, the systems and methods can serve as a self-policing escrow, while simultaneously allowing the primary load management system greater control over the access right after the access right has been initially sold to a user. Certain embodiments of the present disclosure enable the primary load management system to manage and control the reassignment transactions of access rights, regardless of which platform facilitates the reassignment of the access right.

Certain embodiments may also include a system. The system may include one or more data processors; and a non-transitory computer-readable storage medium containing instructions which, when executed on the one or more data processors, cause the one or more data processors to perform operations including the method(s) described above and herein.

Certain embodiments may also include a computer-program product tangibly embodied in a non-transitory machine-readable storage medium, including instructions configured to cause a data processing apparatus to perform operations including the method(s) described above and herein.

Advantageously, according to certain embodiments of the present disclosure, the enhanced security that Blockchain-based systems offer can be leveraged in high-load environments. By evaluating the metadata associated with access right requests, the processing of access right requests using Blockchain-based systems can be optimized to perform at a high efficiency and low latency.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
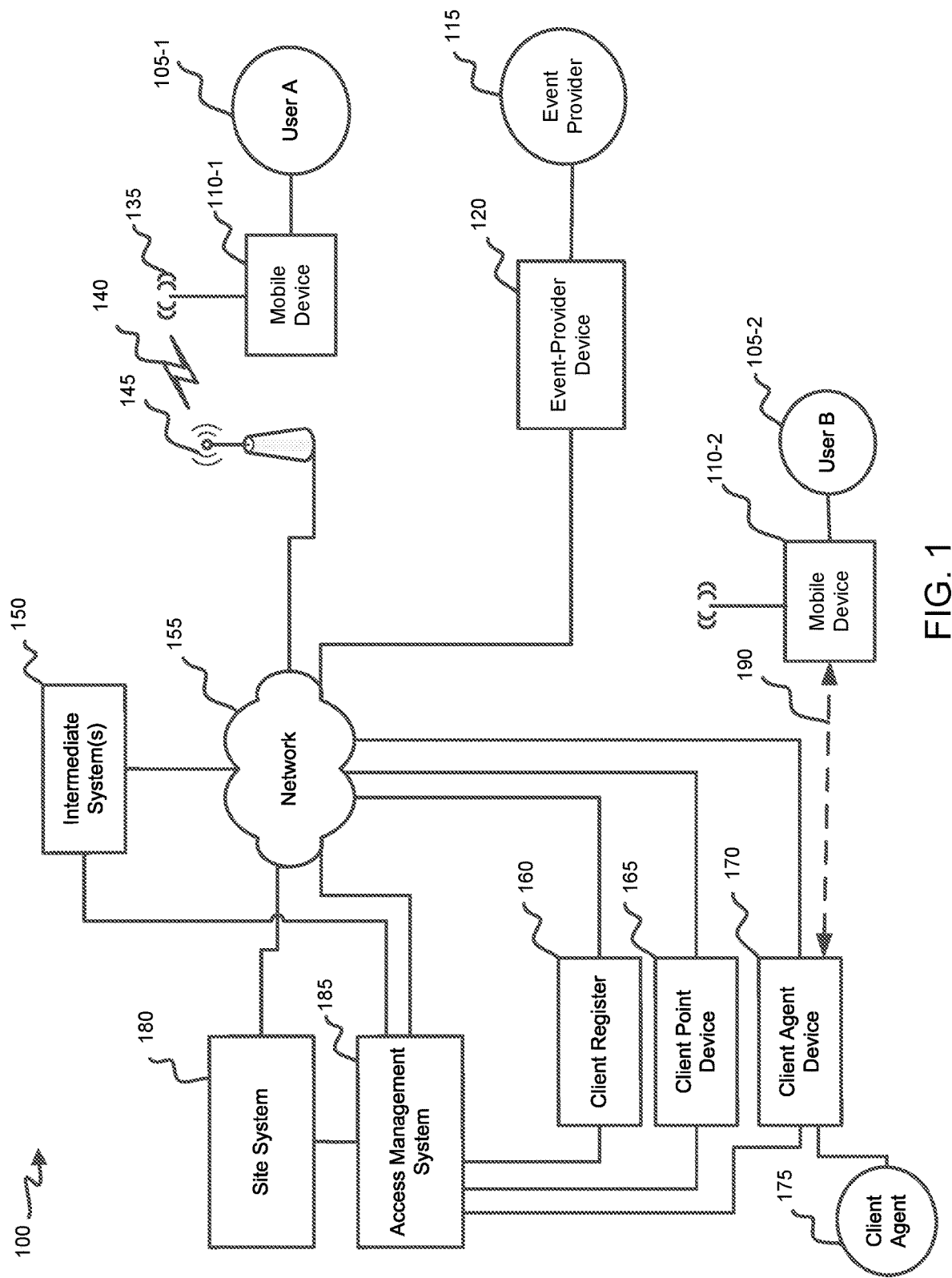
FIG. 1 depicts a block diagram of an embodiment of a resource access-facilitating interaction system.

Managing the assignment of access rights using a centralized server can be insecure and inefficient. For instance, a primary load management system may generate a unique access-enabling code (e.g., a barcode) for each electronic access right to a resource. The unique access-enabling codes may then be stored at a centralized server operated by the primary load management system. However, the central server can be a target for network attacks by hackers. Further, the centralized server can experience times of high-load when access rights are first available for assignment. Servers can overheat and go offline or slow down substantially.

The technical challenges described above can be improved by creating a Blockchain-based system to manage the access-right request or access-right transfer process. In some implementations, a Blockchain-based system can create secure digital assets, such as distributed applications (e.g., smart contracts), that serve as electronic access rights to resources. The secure digital assets can be created using customizable templates that are configured to be compatible with legacy access right management systems. In some implementations, a set of attributes, functions, and/or policies that define the access right can be embedded into a secure digital asset (e.g., smart contract), which is published to a Blockchain-based ledger (e.g., an Ethereum Blockchain). According to certain embodiments of the present disclosure, an access right issuer can create a secure digital asset, which includes self-policing attributes, functions, and/ or policies specific to a resource, by selecting one or more extensible modules to incorporate into a base class. The base class may include access right attributes (e.g., transferability) that are compatible with legacy access right management systems.

In some implementations, once the secure digital assets for a specific resource are created, the secure digital assets can be made available for assignment by the access right issuer as electronic access rights to the resource. The access right issuer may provide a digital queue for storing the electronic access right requests received from the users. Each access right request may be associated with metadata that describes certain information about the access right or access right requestor. The access right issuer can provide a triage queueing system that processes the metadata to reorder the digital queue, so that the most urgent (or important) access right requests are processed by the Blockchain first before less urgent access right requests. As will be described in greater detail herein, the triage queuing system can, for example, filter, reorder, delegate, and/or batch access right requests to optimize throughput and reduce processing latency of access right processing using the Blockchain.

In some implementations, the network topology of the Blockchain-based system of the access right issuer can be dynamically designed to process access right requests at varying scales. For instance, the Blockchain-based system can create a network environment that deploys instances of Blockchains dynamically to meet the demand of a resource. Further, in some implementations, the deployed instances of Blockchains can be clustered, and the access right requests can be intelligently assigned to a cluster of Blockchains for processing.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device (s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

In some implementations, access management system 185 may include a Blockchain-based system that includes plurality of nodes. Each node of the plurality of nodes can store a public ledger comprised of smart contracts. A smart contract can include the attributes, functions, and/or policies of an electronic access right to an event. Further, the smart contract can self-execute so as to digitally facilitate, verify, or enforce the attributes, functions, and/or policies contained within the smart contract. For example, a smart contract may include a policy prohibiting any reassignment of the access right after the access right is assigned by the primary load management system. In this case, the electronic access right would be prohibited from being sold on a secondary market.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as an entity or an entity operating a spatial region. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a spatial region of the resource (e.g., venue) during a time period for which the resource is accessible (e.g., event time). Mobile device 110-2 may directly interact with a client device (e.g., client agent device 170, client register 160 or client point device 165), which is also located at the spatial region during the time period in which the resource is accessible using access rights. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
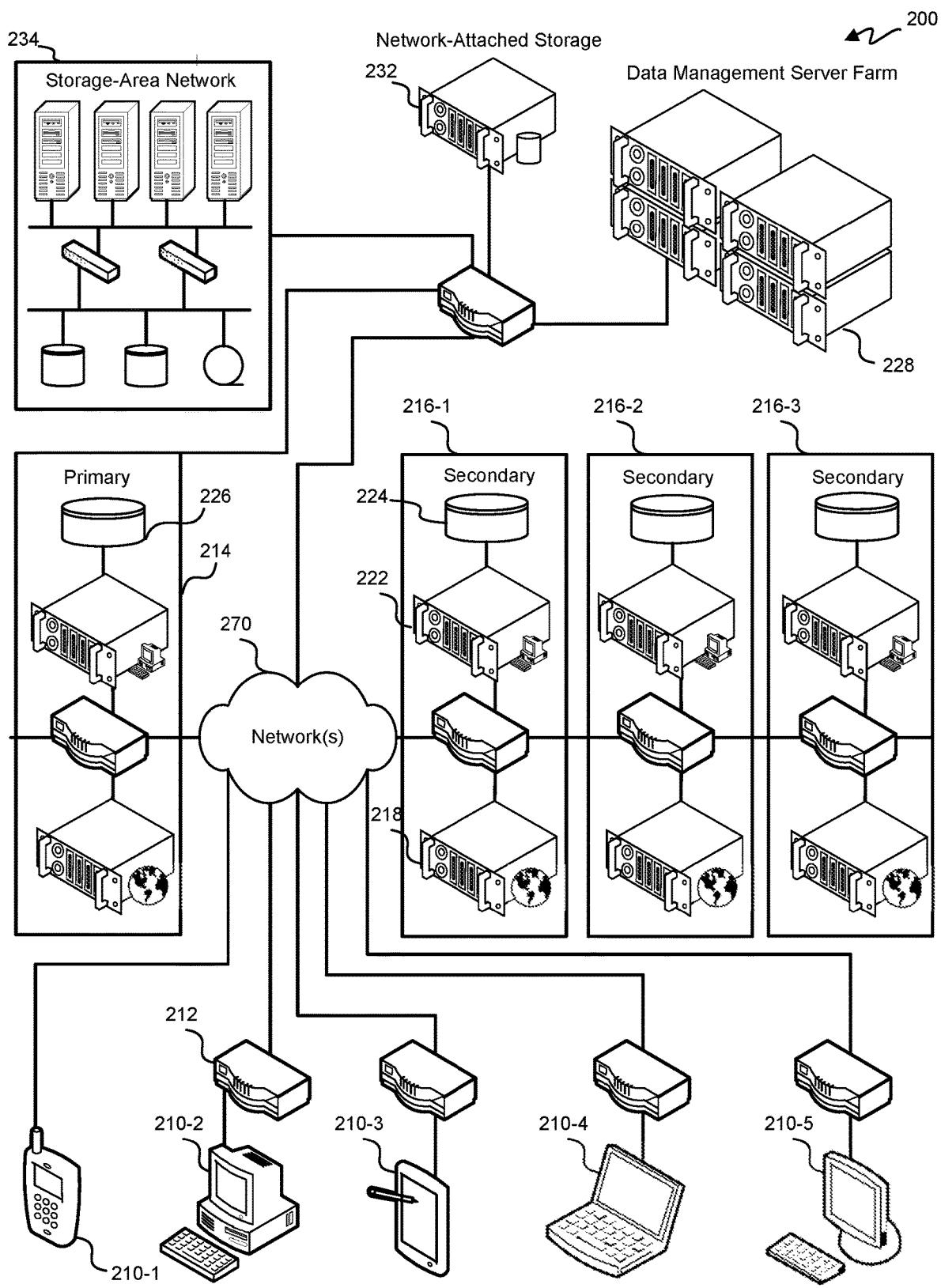
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of a profile, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 185 can include a primary access assignment system 214 and/or a secondary access assignment system 214; data management server farm 228;

and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
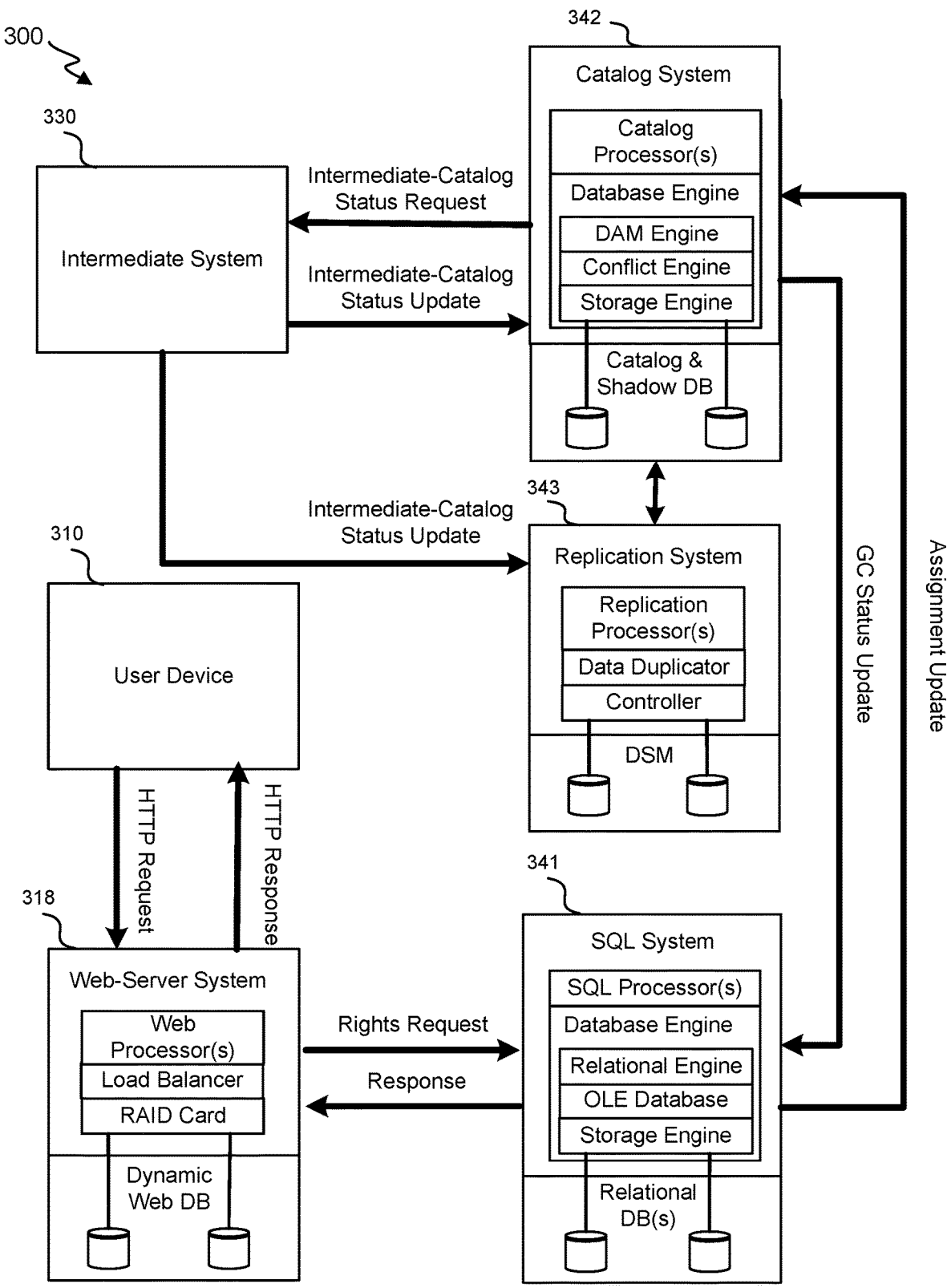
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user profile data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, profile and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of datastore queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic webpages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
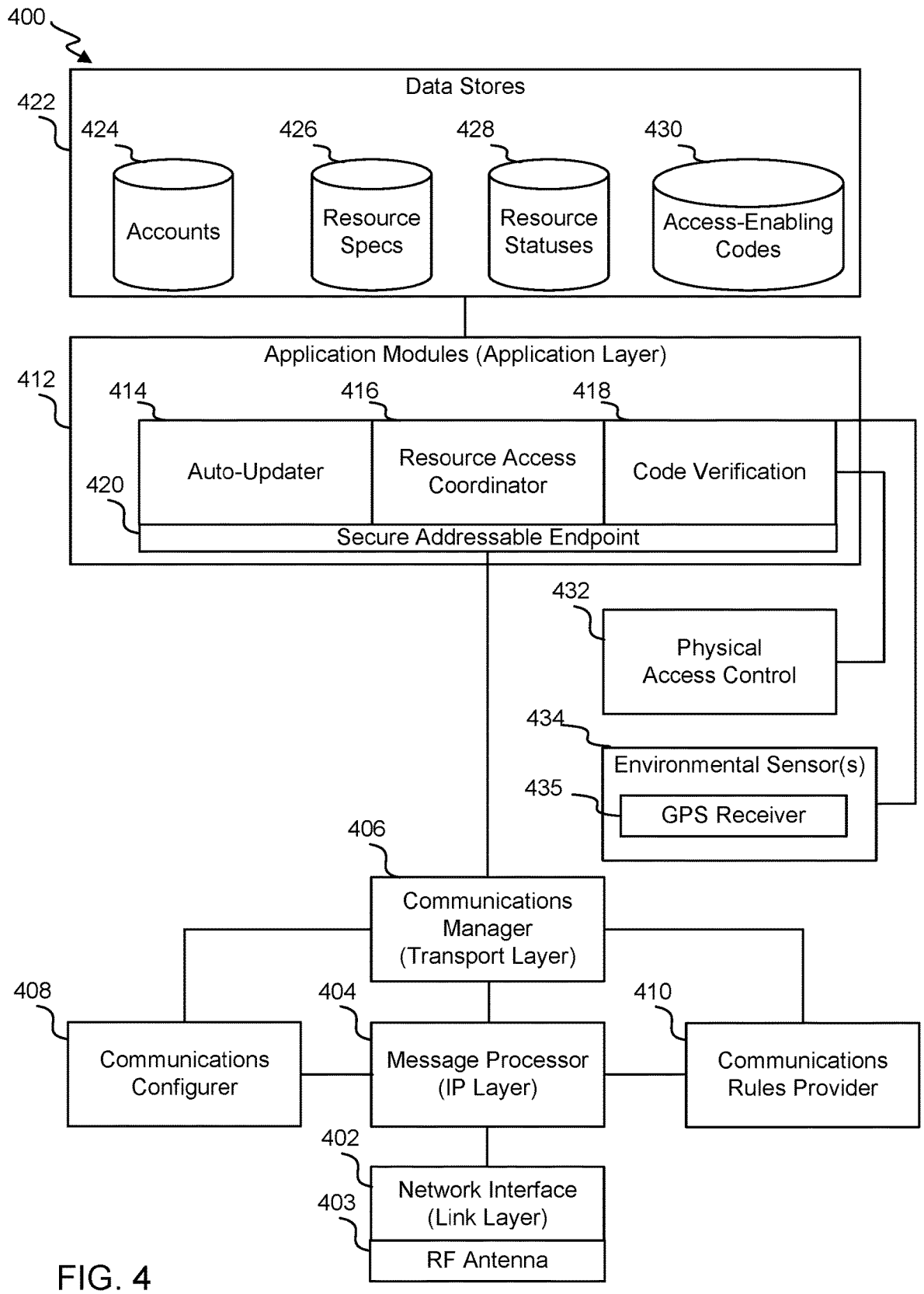
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 185) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource. As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting a check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as a profile data store 424, resource specification data store 426, resource status data store 428 and/or access-enabling code data store 430.

Profile data store 424 can store data for entities, such as administrators, intermediate-system agents and/or users. The profile data can include login information (e.g., username and password), identifying information (e.g., name, residential address, phone number, email address, age and/or gender), professional information (e.g., occupation, affiliation and/or professional position), and preferences (e.g., regarding resource types, entities, access right locations, and/or resource types). The profile data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a resource entity, and/or a spatial region of the resource. Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, automatically and/or tentatively assigned or was assigned a resource. In some instances, status information can indicate that a resource is being held or automatically and/or tentatively assigned and may identify an entity associated with the hold and/or a time at which the hold or reservation will be enabled to be queried.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for access rights to a particular resource can be unique relative to each other. In some instances, at least part of a code identifies a resource or specification of a resource.

One or more of data stores 424, 426, 428, and 430 can be a relational data store, such that elements in one data store can be referenced within another data store. For example, resource status data store 428 can associate an identifier of a particular access right with an identifier of a particular entity. Additional information about the entity can then be retrieved by looking up the entity identifier in profile data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
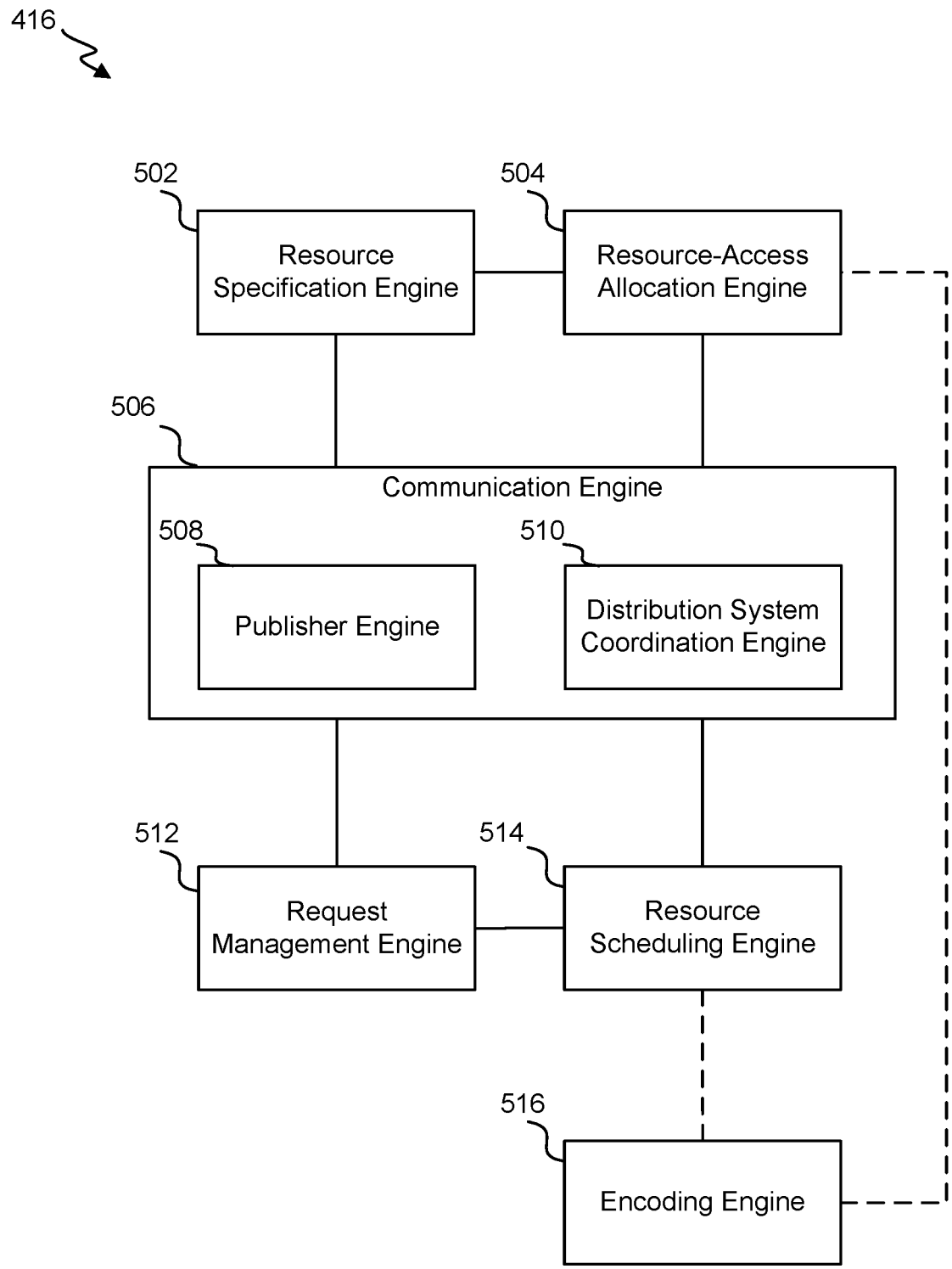
FIG. 5 illustrates example components of resource access coordinator module.

FIG. 5 illustrates example components of resource access coordinator module 416 that may operate, at least in part, at an access management system (e.g., access management system) according to an embodiment of the present disclosure. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or spatial region) of the resource. A specification can also or alternatively include one or more parties associated with the resource. Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on one or more steps of an assignment process or authorization thereof, an allocated access right can be initially unassociated with particular entities (e.g., users). For example, an allocated right can correspond to one or more access characteristics, such as an processor identifier, a usage time, a memory allocation, and/or a geographic location. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for Section 1 may be provided for a first intermediate system to assign, and access rights for Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information, and/or user device information (e.g., type of device, device identifier, and/or IP address).

When all required information has not been received, request management engine 512 can facilitate collection of the information (e.g., via an interface, app page or communication to an intermediate system). Request management engine 512 can also or alternatively execute or facilitate the execution of the assignment process, which includes one or more steps for completing an assignment of an access right to a user device or user profile. For example, publisher engine 508 may receive data inputted by the user via an interface, and request management engine 512 can request authorization to complete the assignment process. In some instances, request management engine 512 retrieves data from a user profile. For example, publisher engine 508 may indicate that a request for an access right has been received while a user was logged into a particular profile. Request management engine 512 may then retrieve, for example, contact information, device information, and/or preferences information associated with the profile from profile data store 424.

In some instances, request management engine 512 prioritizes requests, such as requests for overlapping, similar or same access rights received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests, whether requests were associated with users having established profiles, and/or whether requests were associated with inputs indicative of a bot initiating the request (e.g., shorter inter-click intervals, failed CAPTCHA tests).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining user confirmation) and/or to change a status of the access right(s) to indicate that they have been assigned (e.g., immediately, upon completing an assignment process or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a code (e.g., a 1-dimensional or 2-dimensional code), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a physical manifestation of an access right may be a document with an access code, and a copy of this document may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in profile data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 185, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user profile, and code verification module 418 can determine whether the code-identified device or profile matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable manner so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
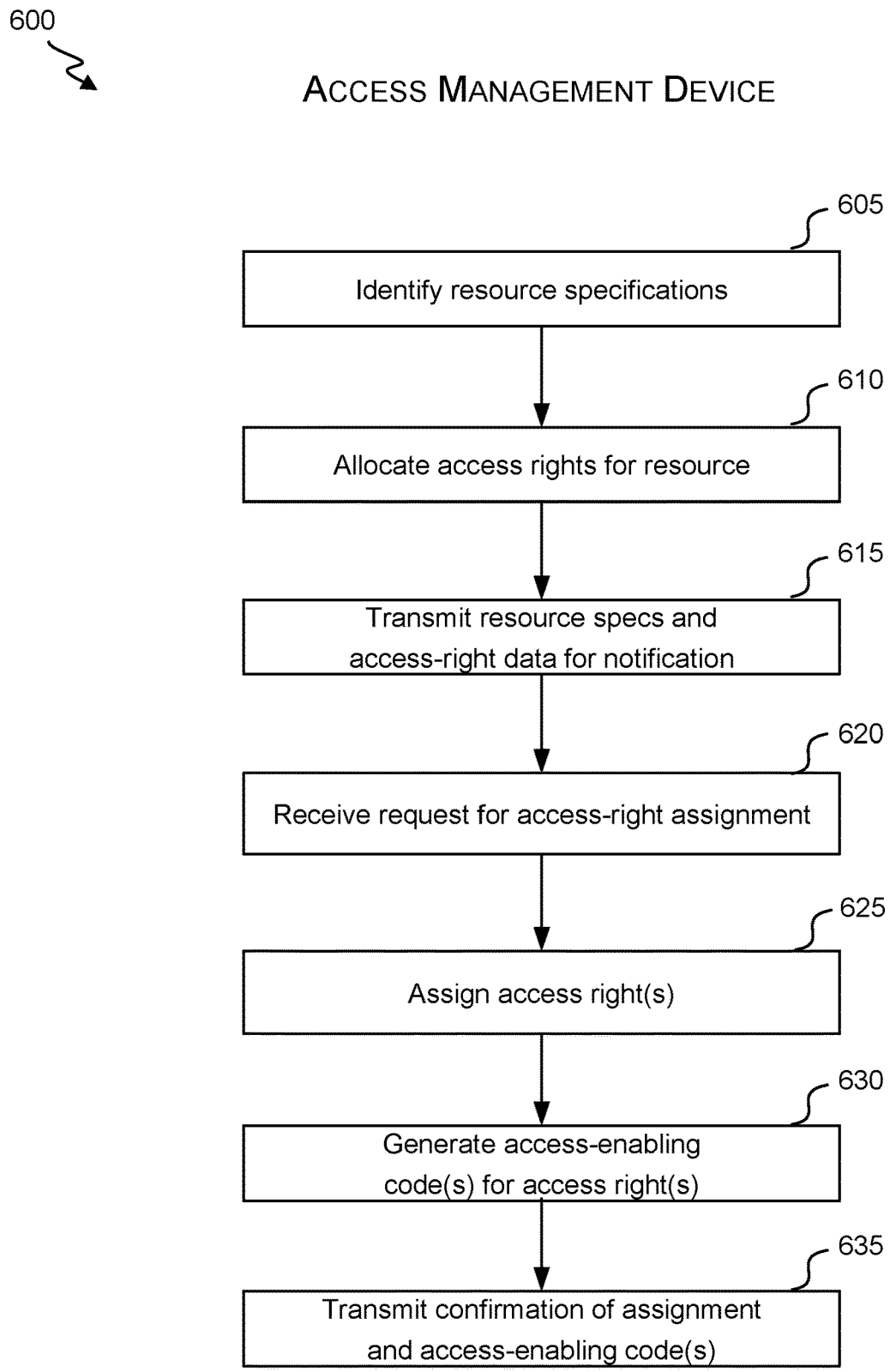
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 185. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights).

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether an assignment process has been completed. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
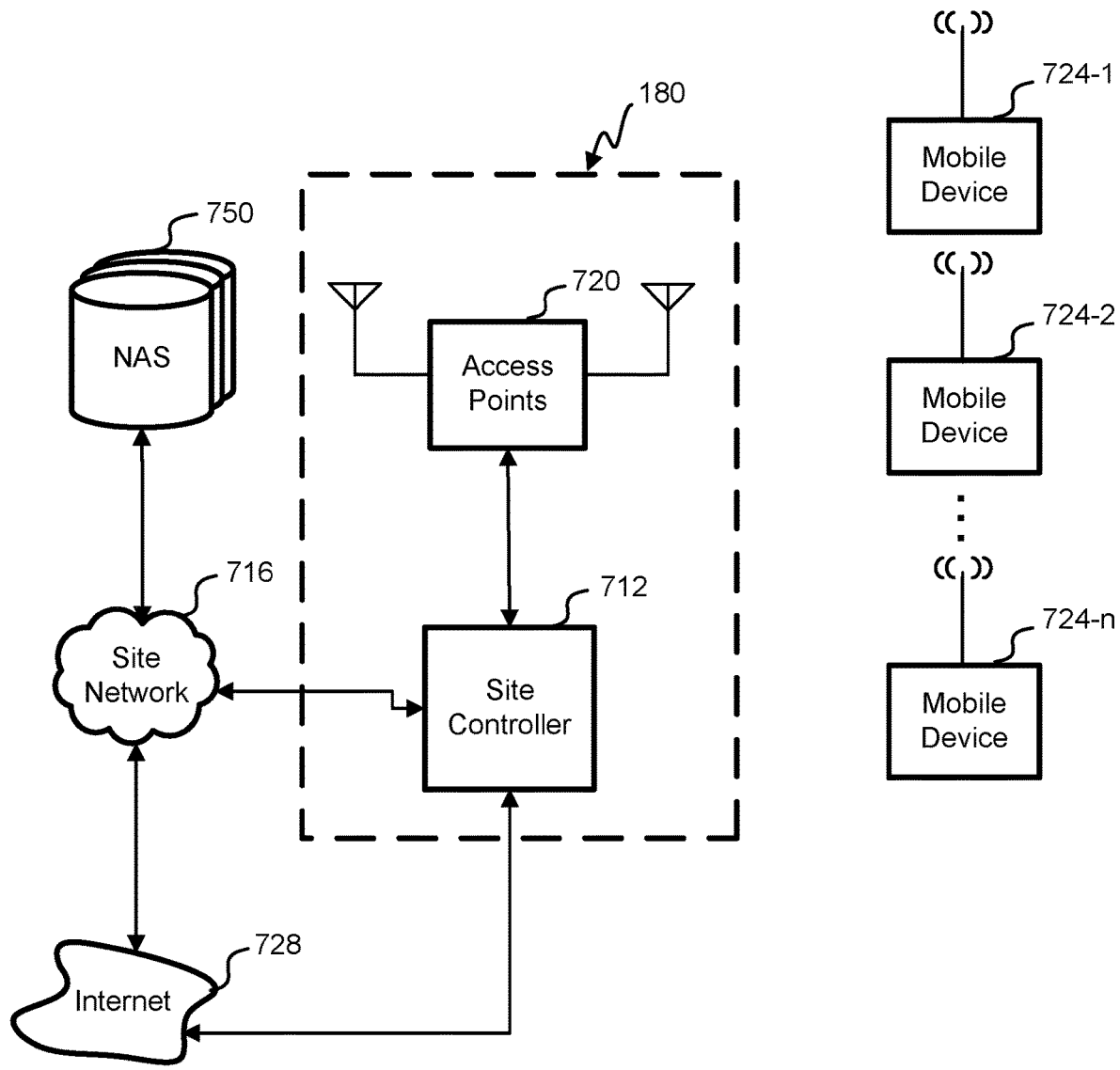
FIGS. 7A and 7B show embodiments of site systems in relations to mobile devices.

Referring to FIG. 7A, an embodiment of a site system 180 is shown in relation to mobile devices 724-$n$, Network Attached Storage (NAS) 750, site network 716 and the Internet 728. In some embodiments, for users located within the spatial region of the resource, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about the resource, videos, images, etc.) held by NAS 750. Additionally, as described herein, content can be gathered from users both before and during the time period the resource is accessible. By connecting to site network 716, mobile device 724 can send content for use by site system 180 or display content received from NAS 750.

Figure 7B:
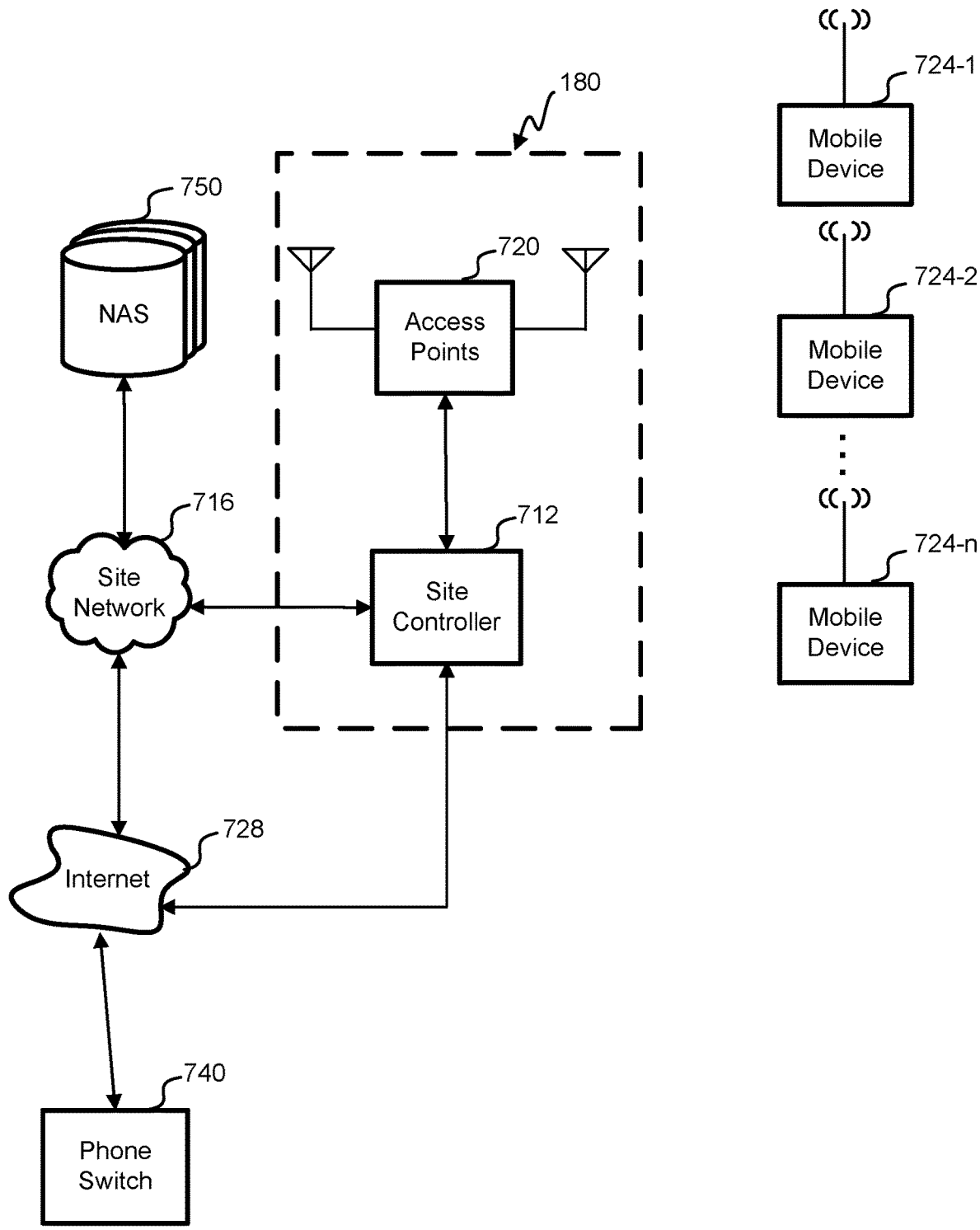

Referring to FIG. 7B, another embodiment of a site system 180 is shown in relation to mobile devices 724-$n$, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
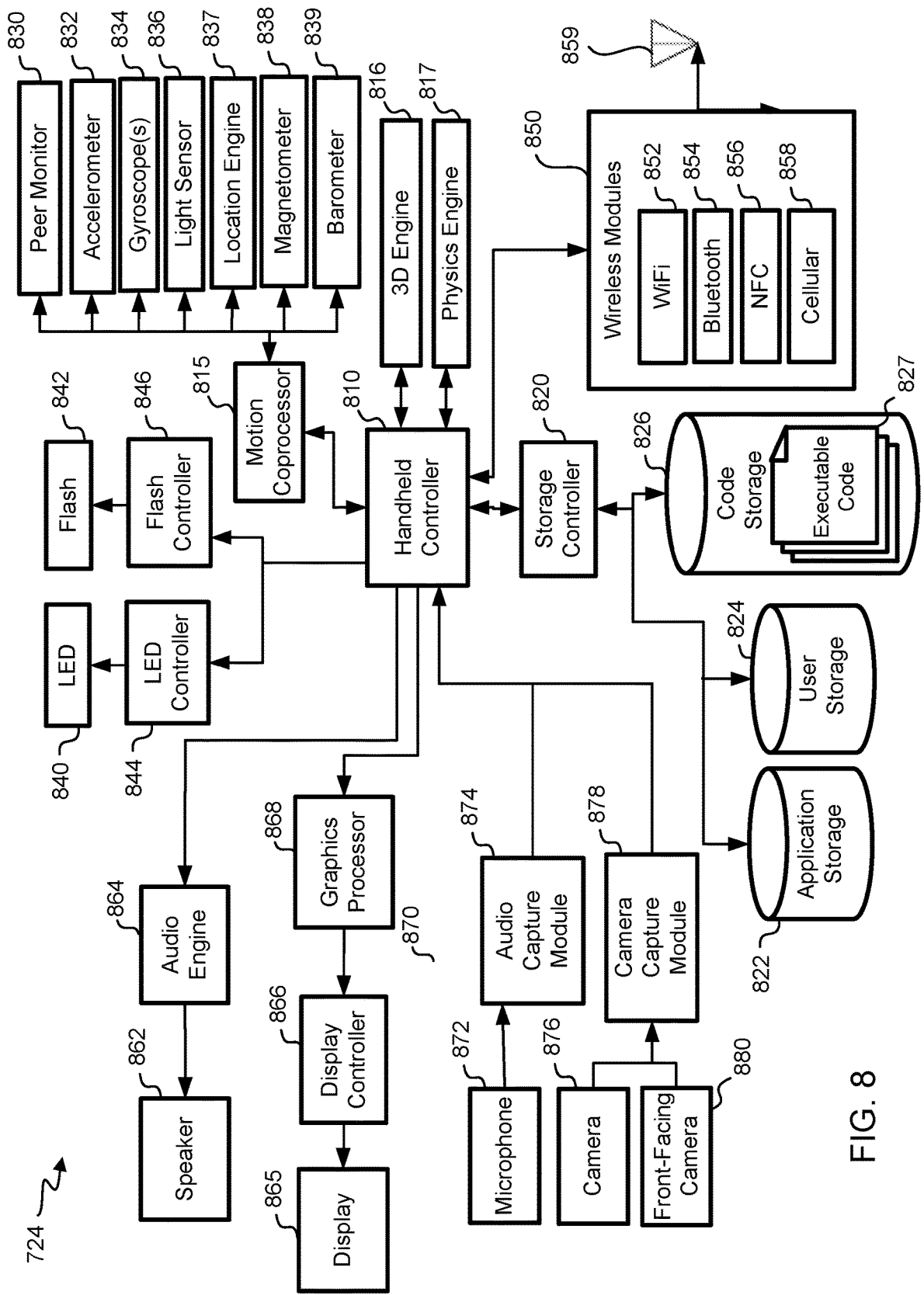
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a "vibrate" or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
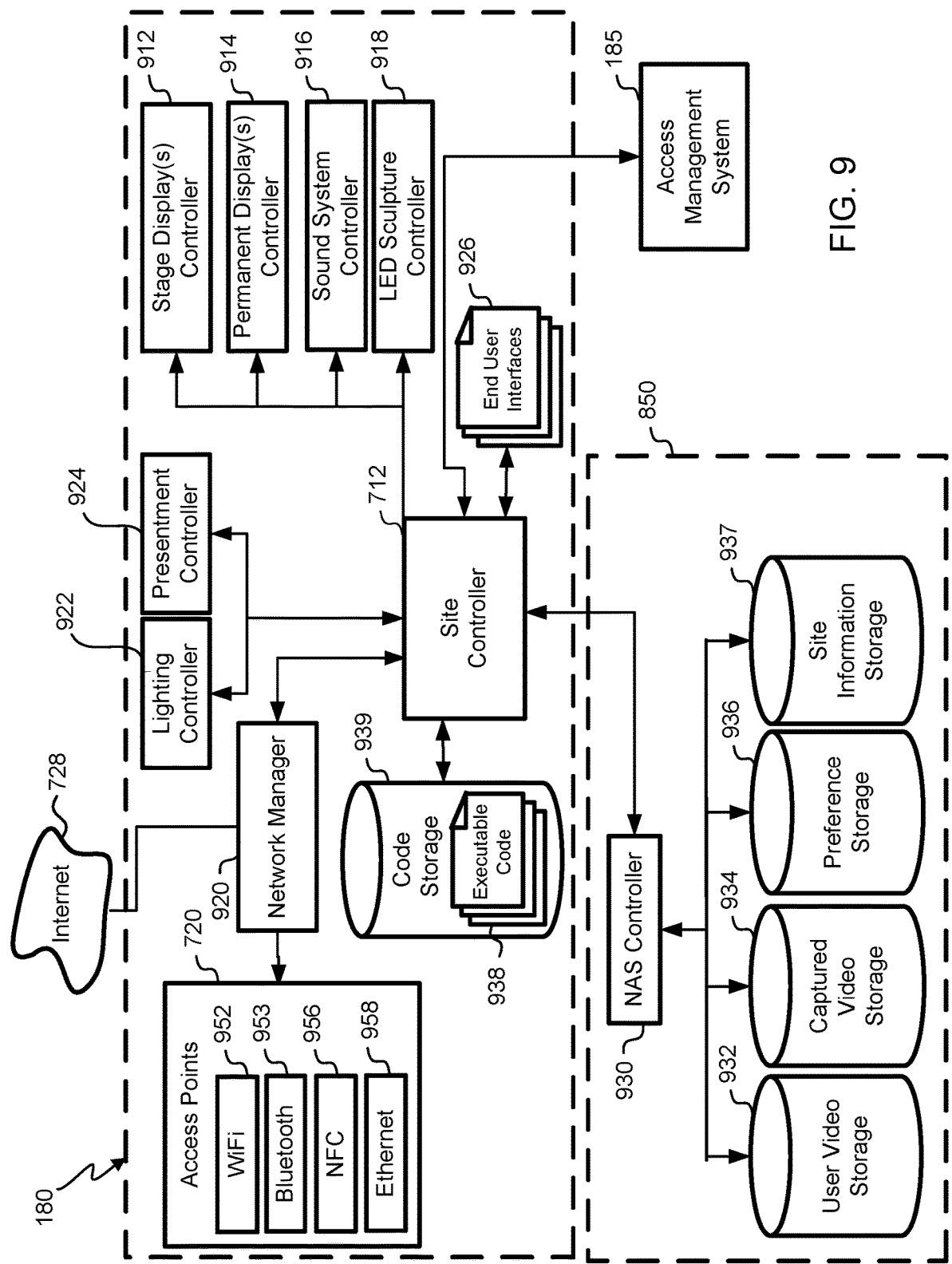
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of a spatial region associated with a resource. An access right grants access to the spatial region during a defined time period. A broad variety of features can be controlled by different embodiments, including: permanent lights (e.g., with lighting controller 922), lights (e.g., with presentment controller 924), display screens (e.g., with stage display(s) controller 912), permanent display screens (e.g., with permanent display(s) controller 914), and the sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., 3D models of site features and structure.

Figure 10A:
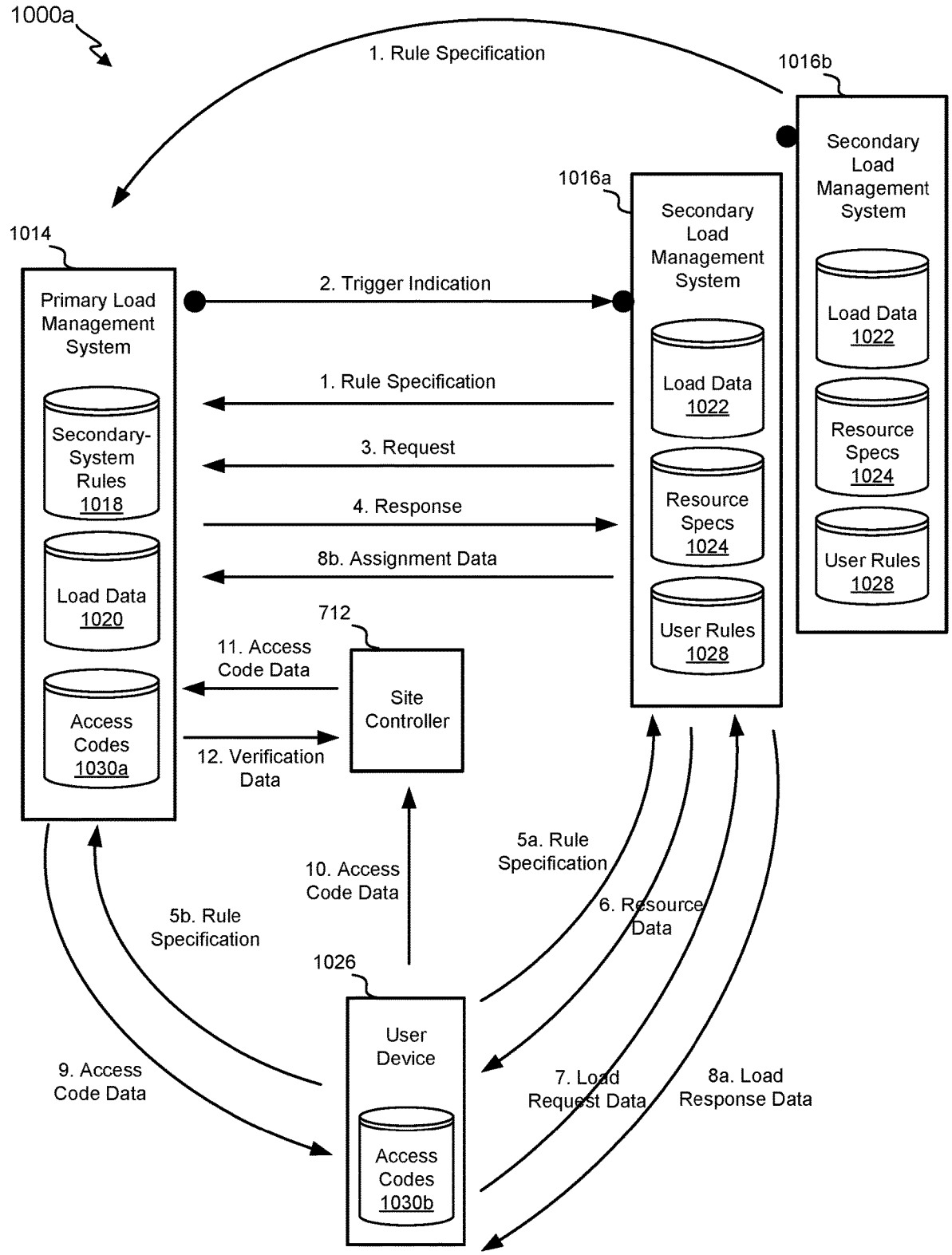
FIGS. 10A and 10B illustrate examples of communication exchanges involving primary and secondary load management systems.

Referring next to FIG. 10A, an example of a communication exchange 1000a involving primary load management system 1014 and each of a plurality of secondary load management systems 1016a, 1016b is shown. In some instances, secondary load management system 1016a is managed by an entity different from an entity that manages secondary load management system 1016b. Primary load management system 1014 may include and/or share properties with a primary assignment management system 214. Each of one or both of secondary load management system 1016a and 1016b may include or correspond to a secondary assignment system 216. Communications shown in FIG. 10 may be transmitted over one or more networks, such as network 270, the Internet and/or a short-range network.

In one instance, one of secondary load management system 1016a or 1016b is managed by a same entity as manages primary load management system 1014. In one instance, each of secondary load management system 1016 and 1016b is managed by an entity different from an entity managing primary load management system 1014. Primary load management system 1014 can include a system that, for example, manages a master access-right assignment data store, distributes access codes, performs verification data for access attempts, and so on. Secondary load management systems 1016a, 1016b can include systems that, for example, facilitate assignment of access codes to users. For example, secondary load management systems 1016a, 1016b can be configured to request allocation of access-right slots, which may result in a temporary or final allocation or assignment to the system, a hold on the access-right slots, and/or a distribution of data pertaining to the slot(s). Secondary load management systems 1016a, 1016b may then facilitate transmission of the access-right slots to one or more users and identify a user that has requested one or more particular access-right slots. The secondary load management system can then facilitate an assignment of the access-right slots by (for example) transmitting one or more access codes to the user device, identifying the user to primary load management system 1014 or updating assignment data.

Communication exchange 1000a begins with transmission of one or more rule specifications from each secondary load management system 1016a, 1016b to primary load management system 1014. The rule specification can include one or more request parameters identify parameters of a load requested for allocation. For example, a rule specification can include a specification pertaining to a size of a target load (e.g., corresponding to a number of access-right slots). The specification may include a particular number or a threshold. A rule specification can include a specification of a type of at least part of the load, such as one that identifies a resource or type of resource and/or one that identifies a characteristic of one or more access-right slots (e.g., a location). The specification may include a first allocation parameter that may identify a value for which access-right slots are being requested.

In some instances, a rule and/or request corresponds to a single resource, while in others, the rule and/or request corresponds to multiple resources. For example, a request may be for access-right results pertaining to each of three resources or to each resource available at a location in a season. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access-right slots is requested for any given resource within a defined time period (e.g., year).

A rule specification can include an allocation parameter that identifies a parameter for allocating a load should it be allocated to the secondary load management system. To illustrate, secondary load management system 1016a, 1016b may be configured to receive allocations of access-right slots but to attempt to facilitate assignment of the access-right slots to users. Communication exchange 1000a can be configured so as to promote facilitated distribution to users upon allocation of access-right slots to a secondary load management system. Early provision of allocation parameters by a secondary load management system can promote such quick facilitated distribution.

For example, an allocation parameter can identify one or more communication channels (e.g., webpages, portals, information-distribution protocols, email addresses, etc.) for transmitting information pertaining to at least part of the load to each of one or more devices and/or a second allocation parameter. This information may enable primary load management system 1014 to (for example) automatically provide information pertaining to allocated access-right slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016a, 1016b based on the rule specifications. The rules can be stored in a secondary system rules data store 1018.

Primary load management system 1014 can further include a load data store 1020. Load data store 1020 can include, for example, information pertaining to which access-right slots for a given resource are available and information pertaining to each of those slots. Load data store 1020 can further identify information pertaining to one or more defined loads, such as which access-right slots are corresponding to the load, to which secondary load management system a load has been allocated, whether an allocation includes any restrictions (e.g., time limits).

Primary load management system 1014 can assess whether a set of available access-right slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access-right slots corresponds to that specified in a request parameter, and/or whether the quantity of access-right slots can be allocated for a value that corresponds to a first allocation parameter specified in a request parameter (e.g., the determination being based on defined values or thresholds associated with the access-right slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016 a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access-right slots remain available and/or distribution priorities of the primary load management system) and it is then determined which rule to which the load corresponds. In some instances, a primary-system rule as to which access-right slots are to be included in a load and/or a secondary-system rule as to which access-right slots are requested may depend on information, such as an environmental characterization corresponding to a resource, a throughput monitor and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016a. The trigger indication may identify characteristics of the load (e.g., a size, type of one or more access-right slots, resource, and/or allocation value). In some instances, the trigger indication may identify a rule and/or what specifications were defined in the triggered rule.

In some instances, communication exchange 1000a is configured so as to provide a secondary load management system 1016a a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016a can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access-right slots in the load may be more precisely identified.

Secondary load management system 1016a can store data pertaining to the load in a load data store 1022. Load data store 1022 may further track statuses of access-right slots so as to be able to identify which access-right slots have been assigned to users. Secondary load management system 1016a can further manage and/or have access to a resource specification data store 1024 that can associate identifiers of various resources with corresponding information. The resource specifications may be, for example, included in a trigger-information or response communication from primary load management system 1014; identified via an external search (e.g., web crawl), and so on. Resource specifications may include, for example, a location and/or a date and time.

A user device 1026 can also transmit rule specifications to one or more of primary load management system 1014 and 1016a. The rule specifications may include request parameters, such as a size specification, type specification and/or assignment value (e.g., that may be precisely identified or a threshold). When rule specifications are transmitted and/or availed to secondary load management system 1016a, a corresponding user rule can be defined for the user device and/or user.

Secondary load management system 1016a can distribute data of a resource (or multiple resources) corresponding to the load allocated to the system. The resource data can include one or more resource specifications stored at resource specification data store 1024. The resource data may further include data associated with one or more access-right slots included in the load. For example, the resource data may identify a time and location of a resource and a location of each of one or more access-right slots. In some instances, the resource data further includes an allocation parameter, such as the second allocation parameter and/or one defined based thereupon included in a secondary-system rule specification or included in a rule associated with secondary load management system 1016a.

In some instances, secondary load management system 1016a controls the transmission of the resource data to one or more user devices 1026. In some instances, primary load management system 1014 facilitates the transmission. For example, the data may be identified in an interface provided, controlled and/or managed by secondary load management system 1016a, but primary load management system 1016 may have authorization to update the webpage, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access-right slots (e.g., and/or one or more resources). Secondary load management system 1016a can evaluate the request and respond with load response data. Such a response may be conditioned (for example) on confirming completion of the assignment process. The load response data may (for example) indicate that the assignment has been accepted and/or include confirmation data. Upon such acceptance, secondary load management system 1016a can also transmit assignment data to primary load management system. The load data can include an identification of the user device (or corresponding information, such as a name, email, profile, device identifier or phone number of a corresponding user) and/or one or more access-right slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access rights being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030b. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000a can be transmitted via (for example) a web site, a web portal, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000a are contemplated. For example, in one instance, secondary load management system 1016a may at least partly manage access codes. For example, one or more access codes corresponding to a load may be transmitted from primary load management system 1014 to secondary load management system 1016a as part of a response. Secondary load management system 1016a may then transmit select access codes to a user device 1026, and (in various instances) either primary load management system 1014 or secondary load management system 1016a may provide verification of the code to site controller 712.

Figure 10B:
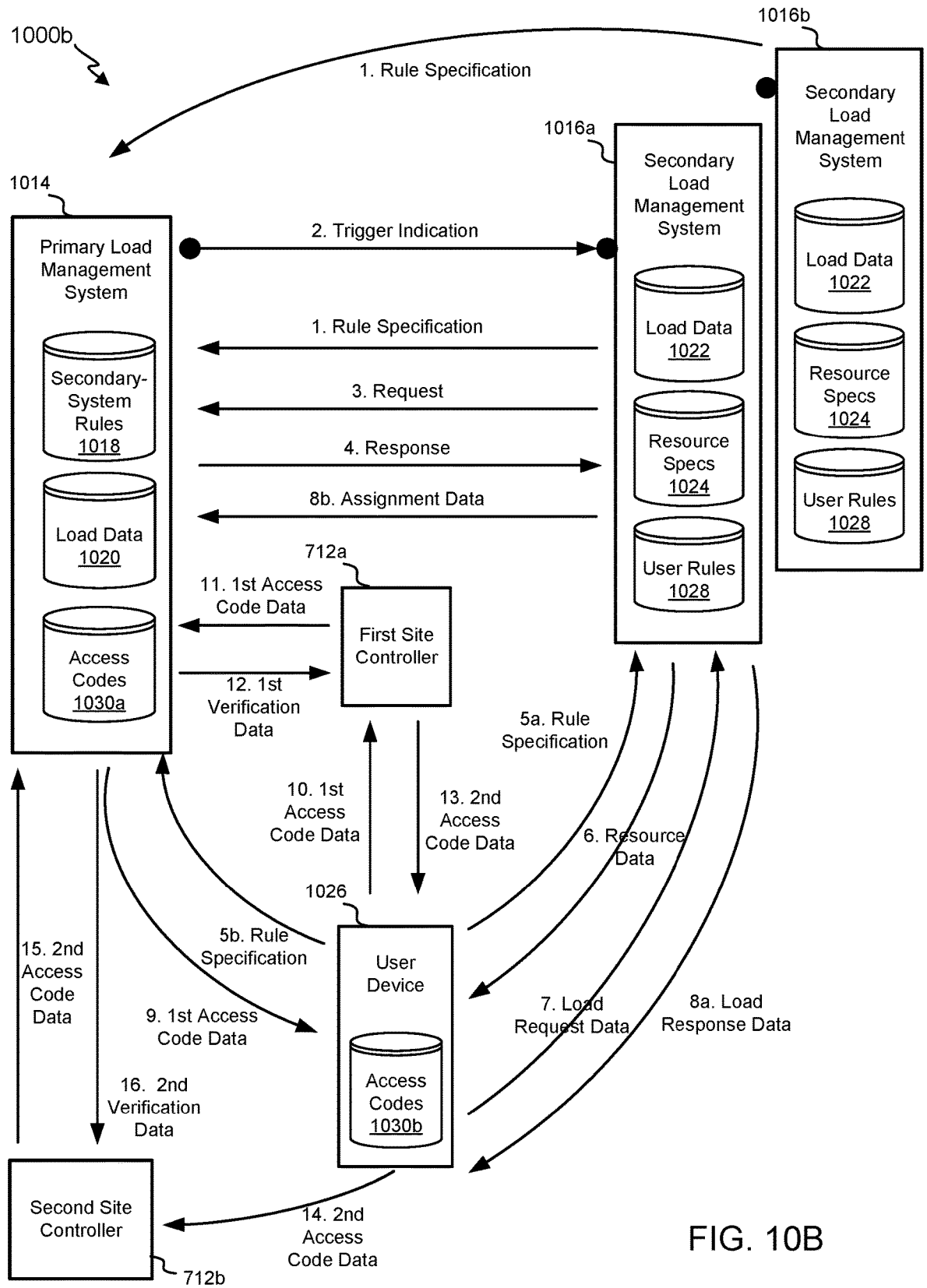

Referring next to FIG. 10B, another example of a communication exchange 1000b involving primary load management system 1014 and each of a plurality of secondary load management systems 1016a, 1016b is shown. In this instance, two different types of access code data are associated with an assignment.

As shown, in response to an initial assignment of an access-right slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712a.

First site controller 712a may communicate with primary load management system 1014 to verify the data, in a manner similar to that described herein. Upon detecting that the first access code data has been verified, first site controller 712a can transmit second access code data to user device 1026. The second access code data have a precision of association that associates the data with one or more particular access characteristics. The second access code data may be, for example, generated at first site controller 712a or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access-right results first access code data had been previously verified and/or which and/or how many second access codes had been generated and/or transmitted.

The second access code data may indicate where access to a resource is authorized, and user device 1026 may thus move to a corresponding location. In some instance, a second site controller 712b is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712b. Second site controller 712b can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712a) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712b, for example, in response to communications from one or more other site controllers and/or primary load management system 1014 that identify second access code data that have been issued.

Figure 11:
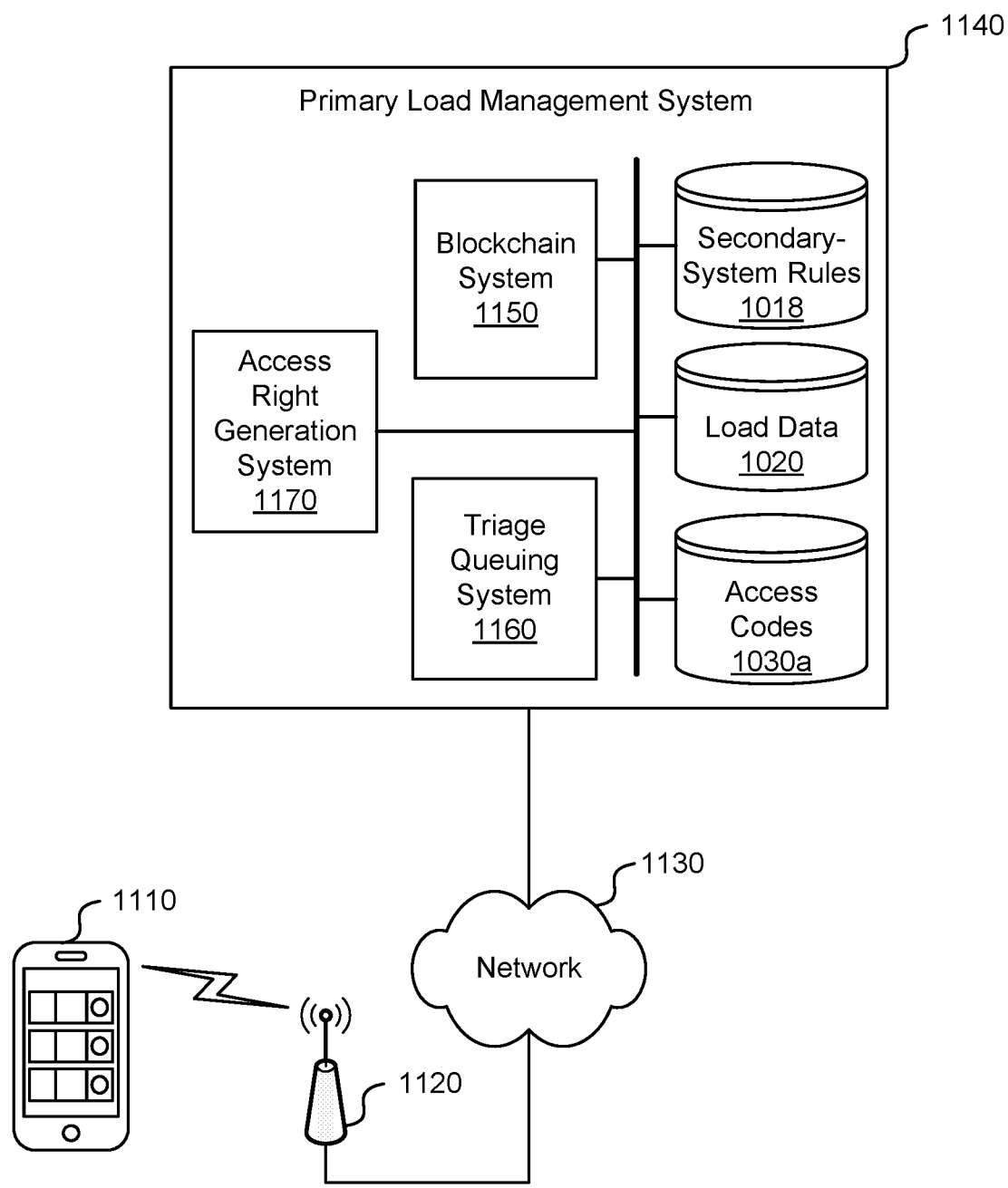
FIG. 11 is a block diagram illustrating an example network environment for optimizing throughput of Blockchain-based systems, according to aspects of the present disclosure.

FIG. 11 is a block diagram illustrating network environment 1100 for optimizing the processing of access right requests using a Blockchain-based system. In some implementations, network environment 1100 may include user device 1110, gateway 1120, network 1130, and primary load management system 1140. User device 1110 may exchange digital signals or digital communications with primary load management system 1140 by way of gateway 1120 and network 1130. Network 1130 may be any public, private or cloud-based network that facilitates communications to the Internet. While user device 1110 is shown as a mobile phone in FIG. 11, it will be appreciated that user device 1110 can be any portable (e.g., laptop, tablet computer, smart watch, or otherwise portable Internet-connected computing device) or non-portable (e.g., desktop computer, electronic kiosk, Internet-connected turnstile, etc.) computing device.

Primary load management system 1140 may include a network of servers and databases. Primary load management system 1140 may include secondary-system rules 1018, load data 1020, and access codes 1030a, as described above. In some implementations, however, primary load management system 1140 may also include Blockchain system 1150, access right generation system 1170, and triage queueing system 1160. Primary load management system 1140 may be a Blockchain-based system that uses Blockchain nodes to manage the generation, ownership, and transfer of secure digital assets (e.g., smart contracts) that represent electronic access rights to resources. As a non-limiting example, primary load management system 1140 may be a networked system operated by a primary ticket issuer. Primary load management system 1140 can generate a secure digital asset to represent an electronic access right to a resource using access right generation system 1170 (described in greater detail in FIG. 14). Primary load management system 1140 may operate an online platform (application servers, web servers, and/or database servers not shown) that enables users to request assignment of access rights online. User device 1110 may access the online platform to request a access right to a resource. The access right request from user device 1110 can be intelligently stored in a queue for processing using triage queueing system 1160 (as described in greater detail in FIG. 12). Additionally, primary load management system 1140 can dynamically scale the network of Blockchains to withstand the high-load resources using Blockchain system 1150 (as described in greater detail in FIG. 15).

Figure 12:
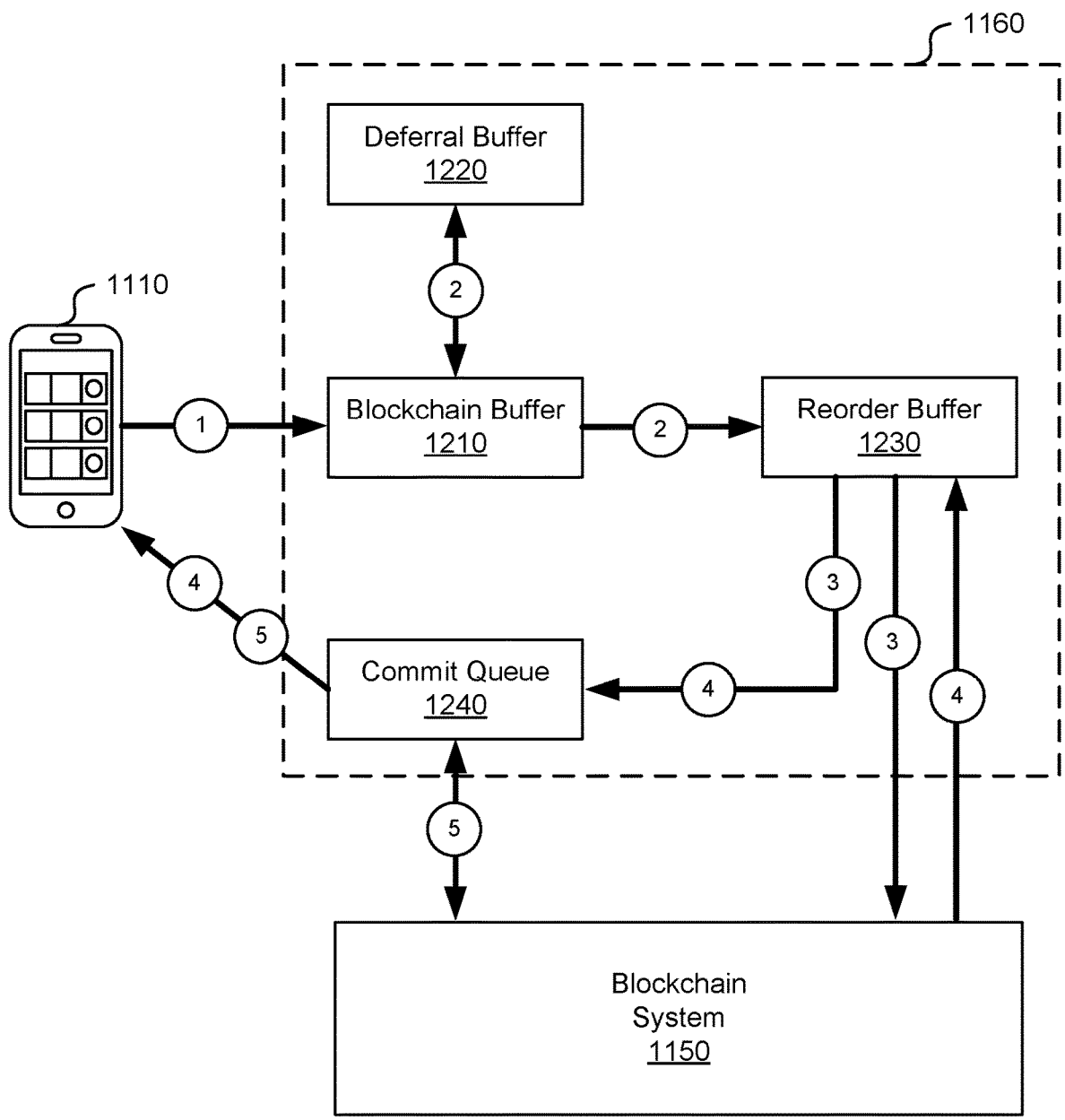
FIG. 12 is a block diagram illustrating an example process flow for reordering a digital queue of access right requests in a Blockchain-based system using a metadata driven architecture, according to aspects of the present disclosure.

FIG. 12 is a block diagram illustrating a process flow 1200 for reordering a digital queue of access right requests in a Blockchain-based system using a metadata driven architecture. Process flow 1200 describes the exemplary steps that occur by the Blockchain-based system to reorder a digital queue of access right requests before submitting each access right request to the Blockchain (e.g., Blockchain system 1150) for processing. The technical challenge with Blockchain is that, traditionally, each transaction is treated equally, regardless of the contextual information associated with the transaction. An urgent transaction would be not prioritized over an unimportant transaction. As such, the metadata representing the contextual information of the transaction would not be efficiently leveraged. Advantageously, process flow 1200 describes a Blockchain-based system that can evaluate the metadata of each access right request and send the urgent access right requests to the Blockchain first before sending the less urgent access right requests.

Process flow 1200 begins at step 1 when user device 1110 transmits a communication corresponding to an access right request to the primary load management system. For example, user device 1110 may access an online platform hosted or backed by primary load management system 1140. User device 1110 can search for available access rights using the online platform, and the user can request assignment of the access right by controlling user device 1110 to transmit the access right request to primary load management system

1140. The access right request may be stored at Blockchain buffer 1210 in a first-in-first-out manner. For example, access right requests received at Blockchain buffer 1210 can stored in an ordered sequence based on the time each access right request was received. Further, in 1, user device 1110 may not directly call the Blockchain (e.g., Blockchain system 1150), but rather, user device 1110 may call an Application Programming Interface (API) that immediately queues the access right request in Blockchain buffer 1210. Calling the API may also trigger an inspection of the access right request (e.g., an evaluation of the metadata associated with the access right request). Blockchain buffer 1210 provides a buffer for access right requests. Advantageously, Blockchain buffer 1210 is highly-available and independent of the utilization of Blockchain system 1150. Blockchain buffer 1210 also enables a sequential first-in-first-out (FIFO) analysis of access right requests to be performed. The FIFO analysis can be used to determine the one or more prioritization rules (e.g., rules defining which and/or one or more execution strategies based on the reordering described in Step 2 below.

Process flow 1200 continues to step 2 where the reorder buffer generates a score (e.g., a parameter) for each request based on one or more prioritization rules. As a non-limiting example, a score can be generated using a weighted combination of numbers. As a further non-limiting example, the prioritization rules can set numerical values for items of metadata, such that items of metadata associated with a high priority level are given a high numerical value (e.g., near 1 with 1 being the highest assignable value), and items of metadata associated with a low priority level are given a low numerical value (e.g., near 0 with 0 or potentially −1 being the lowest assignable value). Using this scoring process, an access right request may include several metadata items and each item may be assigned a numerical value, so that the score for the access right request is a combination of the numerical values. It will be appreciated that any process can be used for scoring each access right request and that the above is simply a non-limiting example.

In some implementations, a score can be determined by determining a priority byte that can be associated with or appended to the access right request. As a non-limiting example, Table 1 provides the bits that can be determined to generate the priority byte for an access right request.

resource, whereas access rights for resources months away do not elicit the same urgency. Including this bit in the priority byte moves access rights for imminent resources to the front of the line in the processing queue.

BIT 3—The transaction operation on the smart contract is also used to evaluate the urgency of the access right request. If the access right request is for transferring an access right from an access right holder to an access right requestor, the expectation is higher that the user is expecting to see a confirmation sooner that the initial assignment of the access right directly from the primary load management system. The threshold for accepting latency in the access right transaction depends heavily on what type of transaction is being performed. Examples of types of transactions may include an initial access right assignment directly from the primary load management system, a transfer of a access right from a access right holder to a access right requestor, a request to return the access right (e.g., a return to the primary load management system because the user can no longer access the resource), a request to update the access right to better or different seat, and other suitable examples.

BIT 1—Some access rights are policy free. The transactions surrounding policy-free access rights are recorded on Blockchain system 1150 as a receipt, as opposed to confirming permissions or adhering to the policies. With policy-free access rights (e.g., tickets with no restrictions on reassignment), it is easier for the user to declare a presumptive close of the record and not rely on Blockchain system 1150 to do subsequent transactions or verifications. The access right requests for policy-free access rights may be assigned a low priority as the urgency is low. However, for access rights with policies (e.g., the access right can only be resold one time) restrict access right operations and could lead to exceptions, the data representing the policy (included in the smart contract as code) should be relayed back to the user as soon as possible. Thus, the impact of the latency is greater when access rights have policies that need to be complied with. The example implementation described above prioritizes those access rights with associated policies, for example, by including a "1" bit in the position of bit 1.

In some implementations, one or more bits in the priority byte are not designated as a flag. This allows for future flags to be designed as the scoring process or algorithm may be

TABLE 1

| BIT 7 | BIT 6 | BIT 5 | BIT 4 | BIT 3 | BIT 2 | BIT 1 | BIT 0 |
|---|---|---|---|---|---|---|---|
| VIP | NOT ASSIGNED | EVENT | NOT ASSIGNED | OPERATION | NOT ASSIGNED | RESTRICTED | NOT ASSIGNED |

BIT 7—By assigning flags, the scoring process or algorithm may make a binary assessment on each criteria in descending order, thus creating a natural prioritization of the criteria based on the highest order bit. If two access rights are associated with the same priority, then the arbitration of which access right request has higher priority is settled on the next different bit in the byte (which will be reflected in the integer produced by the priority byte).

BIT 5—The resource start time may also be important to the urgency of the operation. For example, a resource that is available for access starting in short order (e.g., in the next 24 hours) needs to be prioritized over resources that will being later (e.g., 48 hours or more). The access rights for the soon-to-occur resource are likely to be used very soon and any delay will severely affect the user's ability to attend the refined and extended to recognize additional criteria that can be used to sort and prioritize requests. In addition, the bit order can be reconfigured to modify the prioritization algorithm based on request behavior to customize the approach for sorting access right requests.

In some implementations, two actions may be performed at step 2. For the first action, certain access right requests may be stored in deferral buffer 1220. Several sequential requests that are made by one requestor can occur. However, there may be a required latency needed to settle the first request before any of the requests that follow can be processed (e.g., a latency caused by a confirmation needed to identify the user's fund balance before the additional request can be processed). The user making the several sequential requests may be requesting transactions relating to two different access rights, which incurs no dependency on access right state, but still results in a conflict of the caller that is a by-product of the financial nature of Blockchain's native use case. In situations where Blockchain system 1150 does not have access to fund balance or does not evaluate fund balance, several access right requests from a single user can be processed sequentially or simultaneously. However, in situations where Blockchain system 1150 requires the previous transaction to complete before performing the next task, then deferral buffer 1220 stores any sequential access right requests from a single user until the first access right request is processed.

In some implementations, primary load management system can delegate the transaction to a well-resourced proxy account to perform the transaction on behalf of the initial user. These proxy accounts may be built to assist with multiple transactions to be performed concurrently, which can ensure that the latency is not sequential. Thus, the latency can be n (the block time) instead of x*n, where x is the number of sequential transactions submitted by the user.

For the second action, unlike the above action with a single user submitting multiple different access right requests (e.g., for different resources or seats) sequentially, sequential requests for a single access right can create dependencies that will fail. Because the second request may have a dependency on the first request's result, the first result needs to be added to Blockchain system 1150 before the second request is executed to protect against data dependencies. To handle this, deferral buffer 1220 is provided to pre-emptively handle potential conflicts that could either lead to incorrect actions or trigger certain exceptions. The triage queueing system may flag transactions involving access rights that are actively being serviced and move them to deferral buffer 1220 until the initially processed access right appears in commit queue 1240, indicating that the access right request has been processed and accepted onto the Blockchain (e.g., Blockchain system 1150), at which time the second request can be fed back into Blockchain buffer 1210 for another pass from the triage queuing system. If multiple requests for the same access right have been deferred, FIFO logic may consume each request sequentially, and therefore requests may be deferred more than once. However, due to the access right request, the VIP bit can be set to ensure prompt attention and minimize the overall latency as seen by the user.

Once a priority score is assigned to the access right request and the requestor is defined, the access right request may be routed to reorder buffer 1230, which is a priority queue that uses the score to determine the next request to be executed. If multiple requests have identical priority, then the queue defaults to a FIFO queue where the requests are ordered based on the time that the request was received. However, if the requests have different scores, then reorder buffer 1230 may store access right requests in the order of highest priority to lowest priority, such that the highest priority access right request is processed by the Blockchain first.

At step 3, the access right requests stored in reorder buffer are now serviced by Blockchain system 1150 (e.g., a Blockchain Abstraction Layer (BAL) (not shown) that assigns the access right requests to different nodes). As access right requests are processed by Blockchain system 1150, the BAL may be responsible for making the actual requests to Blockchain system 1150. By decoupling from the triage queueing system, this allows for the ability to create a consistent interface upon the original access right request, while delivering a provider model against different Blockchains. Additionally, step 3 includes notifying commit queue 1240 of the response of Blockchain system 1150.

At step 4, the BAL is responsible for managing the status of the access right request. In addition to calling Blockchain system 1150 in step 3, the BAL also captures the response from the transaction and stores the response in a response queue. A Blockchain transaction may be in two states: (1) a state where the transactions is successful and marked for inclusion in the next block, and (2) a state where the block has been added to Blockchain, thereby completing the transaction. Because block times can often be a certain amount of seconds or longer, a latency is created between these two states is addressed here. The Blockchain in the latency between the confirmation of execution and actual inclusion onto the Blockchain causes a resource dependency error where the subsequent operation may operate with incorrect data. By maintaining a "two-phase commit," future Blockchain operations can be stalled until the Blockchain has been properly modified, and confirmation of the operation can be presented to the user. For example, Phase 1 informs the access right requestor of the status of the transaction, and Phase 2 enables the next transaction to be processed.

Step 5 is triggered once the new block containing the transaction has indeed been added to the Blockchain and Phase 2 (indicated above) has occurred. Once this stage is reached and the Blockchain reflects the completed transaction, the access right request should be considered complete and subsequent operations should are safe from any Read After Write (RAW) dependencies that may occur.

For the purpose of illustration and only as a non-limiting example, a resource can have access rights available for assignment at the same time that a different resource is about to start. The rush of thousands of access right requests can be sent to Blockchain system 1150 to generate access rights for the first resource and overwhelm the resources at the same time that a user is trying to transfer an access right to another user to get into the second resource. However, the users of the first resource are in no rush to get their access rights as long as they receive a guarantee that they will eventually receive the access rights in the future. The Blockchain requests of users for the first resource should receive lower priority when compared to the users that are about to enter the arena for the second resource. Thus, the transfer request for the second resource should move to the "front of the line" to minimize the latency and have a presumptive close of the transaction to allow unlocking of the access right. However, this is also the time to identify potentially insecure behavior such as multiple access right transfers of the same access right, which may be stored in deferral buffer 1220, but would be denied once the first access right request is stored in commit queue 1240.

It will be appreciated that the Blockchain-based system may be an independent service that sits in front of the Blockchain and handles requests through a REST interface. In addition to enabling the modification of the implementation without incurring any issues around dependencies of a direct call, it also allows for the diversity of clients to the service, including those who belong to a consortium, if that business decision is made. An API gateway can confirm the authorization of the access right requestor and accepts requests that are formed as JSON objects, which may include sufficient information to define priority. It will be appreciated that the request may be submitted to reorder buffer 1230, as well as registered in a MongoDB database (e.g., Blockchain buffer 1210), which is responsible for storing the status of the request.

It will be appreciated that reorder buffer 1230 may enable the submission to different Blockchains through use of a provider queue that allows a second level of request routing to select the correct Blockchain. It will also be appreciated that the BAL can route the instructions properly (e.g., to the intended destination). Each Blockchain provider may deliver an extra layer of optimization to leverage techniques unique to each Blockchain implementation.

Figure 13:
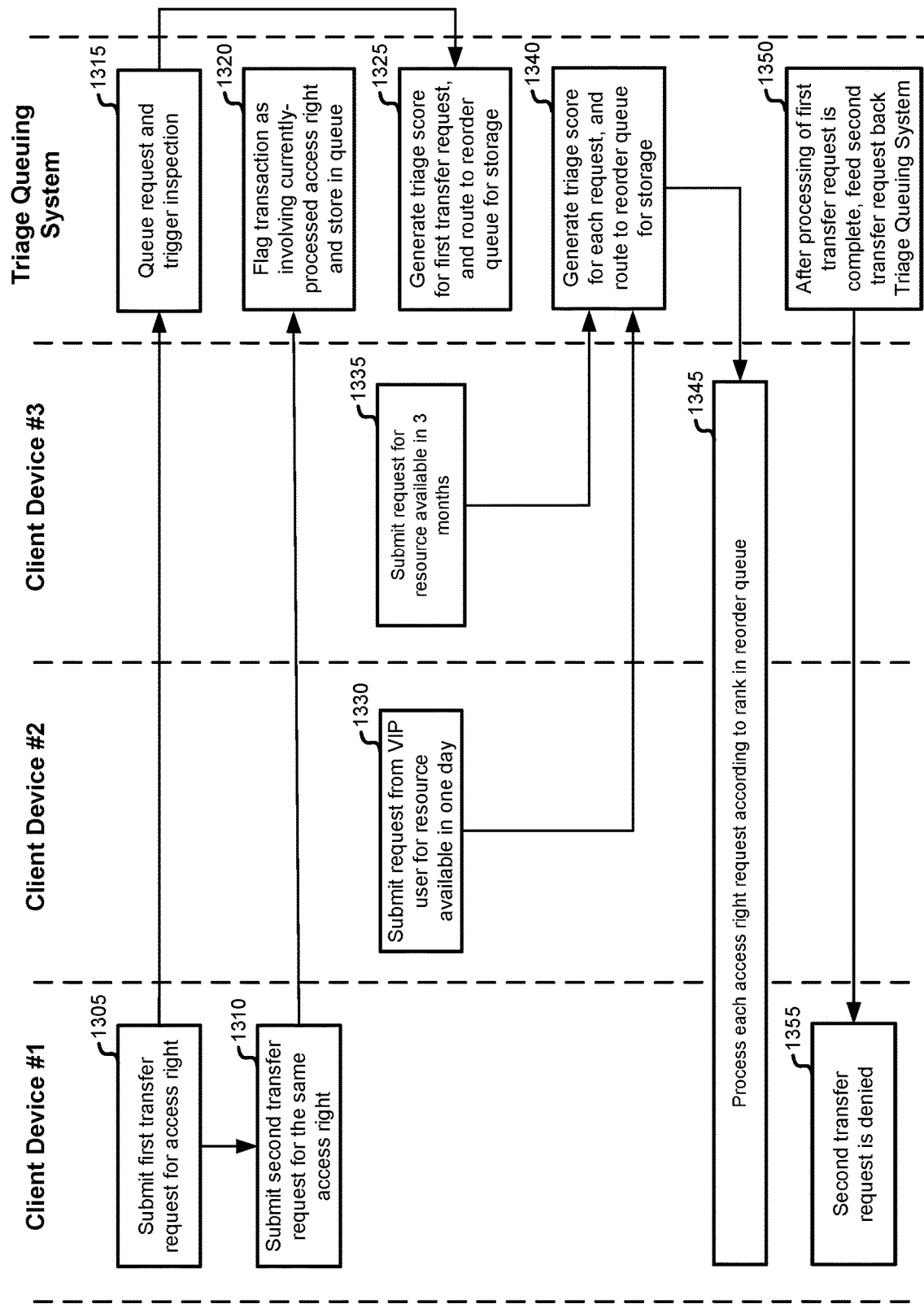
FIG. 13 is a swimlane diagram illustrating an example process flow for reordering a digital queue of access right requests in a Blockchain-based system using a metadata driven architecture, according to aspects of the present disclosure.

FIG. 13 is a swimlane diagram illustrating process flow 1300 for reordering a digital queue of access right requests in a Blockchain-based system using a metadata driven architecture. Process flow 1300 may be performed to reorder a digital queue of access right requests based on metadata associated with each request in a Blockchain-based system. Process flow 1300 may be performed at least in part by any of a user/client device, the primary load management system, the triage queueing system, the Blockchain system, or any other component of network environment 1100 or any of the computing elements shown in process flow 1200.

Process flow 1300 begins at block 1305 client device #1 transmits a first transfer request to transfer a access right to a particular user. For example, client device #1 may access an online platform using a URL to submit the access right transfer request. At block 1310, client device #1 may transmit a second access right transfer request for the same access right to the online platform. For example, the user operating client device #1 may be attempting to reassign the same access right to a different user. At block 1315, the first transfer request is received at the triage queuing system and stored at the Blockchain buffer. At block 1320, the second transfer request is also received at the triage queueing system and detected as being a transfer request for the same access right by the same user. Thus, the second transfer request is not stored in the Blockchain buffer, but rather is stored in the deferral buffer to be processed after the first transfer request is processed and placed in the commit queue. At block 1325, a score is generated for the first transfer request. For example, the score can be generated by creating a priority byte for the first transfer request. The first transfer request is transmitted to the reorder queue (also referred to herein as reorder buffer) and stored in a queue position based on the corresponding priority byte as compared to the priority bytes of other requests stored in the reorder queue.

At block 1330, client device #2 transmits an access right request for a resource that is one day away. The user operating client device #2 (i.e., the user account which the client device #2 is signed into) is a member of a VIP group. At block 1335, client device #3 transmits an access right request for a resource that is three months away. At block 1340, when each access right request is received at the triage queuing system, a priority byte can be generated. The priority byte can represent the prioritization or triage score representing an access right request. As described above, the access right request received from client device #2 will be associated with a high priority because the access right request was sent by a member of a VIP group (e.g., see Bit 7 above). Further, the access right request received from client device #3 will be associated with a low priority because the access right request is for a resource that is three months away, and thus, not an urgent request. The reorder queue stores each of the first transfer request, the access right request from the client device #2, and the access right request from the client device #3 in an order that is based on the priority byte associated with each request. In this case, as a non-limiting example, the access right request from client device #2 may have the highest priority, the first transfer request may have the next highest priority (because access right transfer requests are given priority due to the need for low latency), and the access right request from client device #3 may have the lowest priority (because the access right request is for a resource that is three months away, and thus, not urgent).

At block 1350, after processing the first transfer request at block 1345, the first transfer request is then moved from the reorder queue to the commit queue, which is an indication that the first transfer request has now been added to the Blockchain provided by the Blockchain system. At this point, the access right that is the basis of the first transfer request is now owned by the user that requested the access right from the access right holder who requested the transfer. At block 1355, the second transfer request is retrieved from the deferral buffer and processed. Once processed, the Blockchain system returns a denial because the second transfer request corresponds to an access right that is no longer assigned to the original access right holder.

It will be appreciated that process flow 1300 above is an example process flow that illustrates the different priorities assigned to different types of access right transactions (e.g., smart contracts). As such, the process flow 1300 is merely an example and does not limit the actions, workflows, or process flows that are performable by the Blockchain-based system described herein.

Figure 14:
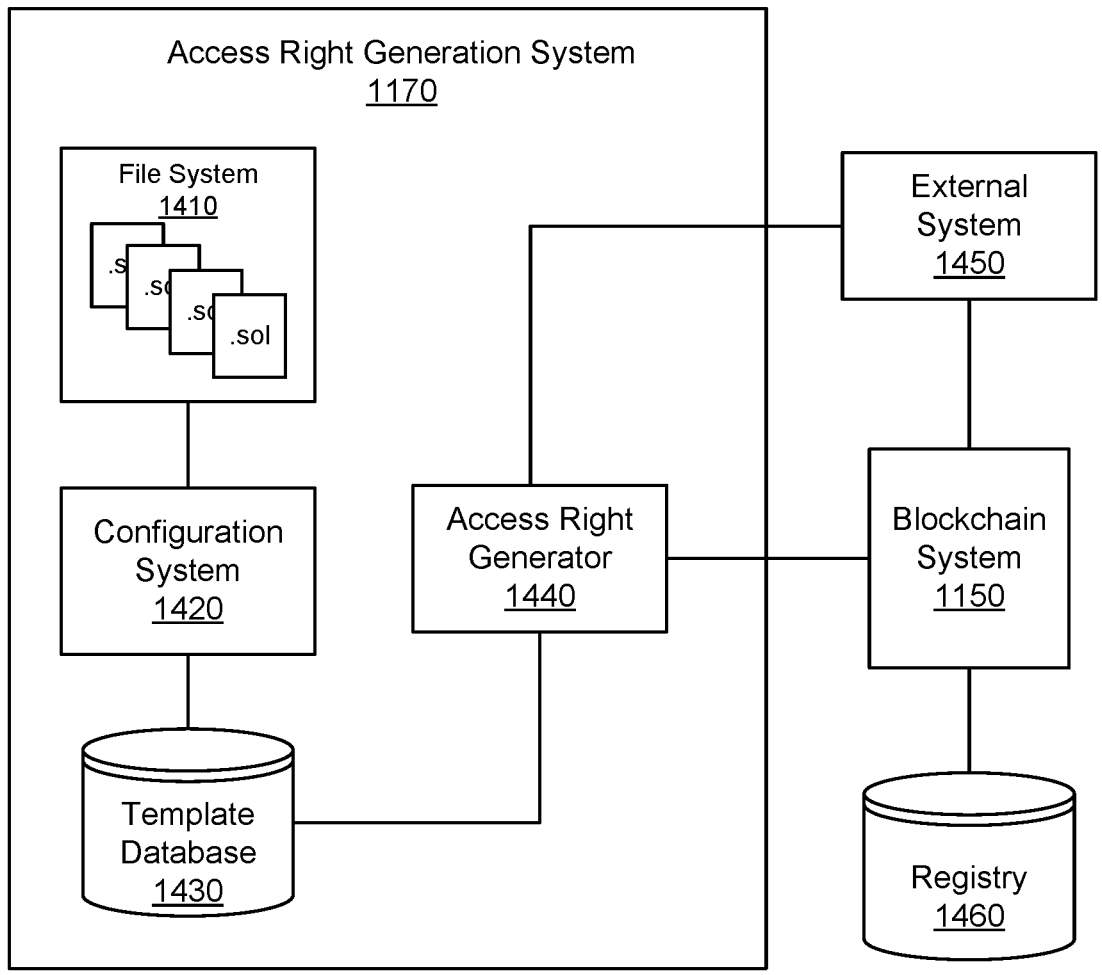
FIG. 14 is a block diagram illustrating an example network environment for generating a secure digital asset to represent an electronic access right to a resource, according to aspects of the present disclosure.

FIG. 14 is a block diagram illustrating network environment 1400 that enables the generation of smart contracts to serve as access rights for resources. While FIGS. 12-13 describe the reordering of smart contracts based on the metadata associated with the smart contracts, FIG. 14 describes how smart contracts are generated to represent secure access rights to resources. In some implementations, network environment 1400 may include access right generation system 1170, which communicates with Blockchain system 1150 to generate a smart contract with one or more attributes, functions, and/or policies that mimic or represent a digital access right to a resource. The generated smart contract can then be stored on the Blockchain system 1150.

Access right generation system 1170 may include a network of one or more servers and/or one or more databases that are configured to compose a unique smart contract to serve as an access right to a resource. In some implementations, file system 1410 may include a server or database that stores Solidity files. Solidity files are the native language of the Ethereum Blockchain. For example, a smart contract (e.g., electronic ticket) can be composed by compiling one or more Solidity files. It will be appreciated that any suitable language or file type can be used to compose a digital access right, and that Solidity files are a non-limiting example of the language that can underlie the modular components of an access right. The Solidity files may include a core file (e.g., a base class) that includes the various configurations and/or fundamental function(s) that each access right should have as a baseline set of configurations or functionality. Additionally, the Solidity files may include one or more extensible modules (e.g., an extension class) that can be used to customize the core file. For example, the core file may include a canonical set of attributes, functionalities, and/or policies, such as the code that facilitates or enables access right transfer, token or barcode access, access right revocation, and other suitable attributes, functions, or policies that serve as a baseline for all access rights. Access rights generated using the core file may be compatible with legacy systems. The one or more extensible modules may include a set of attributes, functionalities, and/or policies that customize the core file, for example, a Solidity file that supports access right transfer via escrow. The one or more extensible modules can add functionality to the core file or override functionality of the core file.

Advantageously, basing the architecture of an access right on this core file enables the access rights to be compatible with legacy systems. Further, by writing code for access rights in Ethereum's native Solidity language, access right generation system 1170 gains the features of an object-oriented language including inheritance, encapsulation, and polymorphism. These characteristics can be exploited to automate and construct a customizable smart contract template that supports backward compatibility with legacy systems. In some implementations, the generated smart contracts are removed from an application database and stored on the Blockchain system 1150 in order to effectively decouple the functionality from the primary operating application. The intersection of templatized, extensible object-oriented contracts and the ability to deploy the contracts on a decoupled, distributed Blockchain enables users to create secure digital assets in an efficient modular process.

In some implementations, the construction of a smart contract template is based on a series of Solidity files that can be compiled and linked into one single ABI file and one byte code representation. The ABI file and byte code representation can later be recalled using a template identifier and utilized for the construction of an instance of an access right on a Blockchain. In addition to storing the template for future reference, this process can perform a validation process to ensure a baseline of functionality that can be access in a canonical format. In some implementations, access right generator 1440 is configured to provision an access right. For example, access right generator 1440 can provide an interface to an access right designer that enables the access right designer to cause access right generator 1440 to perform a lookup of the template database 1430 to acquire the parameters of a smart contract creation on the Blockchain, and a subsequent registration in registry 1460. In some implementations, Blockchain system 1150 can enable Ethereum-compliant access to an access right by using registry 1460 to assist the direct retrieval of requisite metadata (ABI) to construct a request using the Web3 libraries. For example, with the creation of each new class, a Solidity compiler creates a byte code and an ABI file that should be registered in a directory with a unique identifier for the template (e.g., stored at registry 1460). When a client application creates an access right (e.g., when an external system accesses access right generator 1440 or Blockchain system 1150), the client can construct an access right and then call a retrieval function to retrieve the access right.

In some implementations, once a template has been created and stored in template database 1430, any access right built against that template does not need to be rewritten. Instead, access right generator 1440 can perform a lookup of the pre-compiled template (consisting of the ABI file and the byte code) and push the pre-compiled template to Blockchain system 1150 as a signed transaction. Because the template has passed the validation tests, any access right that is generated will support a baseline of functionality. Template database 1430 avoids the need for redundant and computationally expensive compiling and validating of the code with each generation of the access right, and thus, the network structure illustrated in FIG. 14 improves a processor's ability to efficiently process data. Once the template is retrieved from template database 1430, the pre-compiled template data can be passed to a function, which leverages the Web3 library to publish the smart contract to Blockchain system 1150.

In some implementations, access right generator 1440 may be an interface that enables an access right designer to select one or more Solidity files to compose an access right. In some implementations, access right generator 1440 enables the user to drag-and-drop various Solidity files to customize the attributes, functionality, and/or policies that apply to the access right. Once the desired Solidity files are selected, the access right can be composed. Composing the access right includes storing a template or a template identifier (in template database 1430) representing the composed access right, so that access right generation for future access rights can be easily repeated. As a non-limiting example, a user may select loyalty_programs.sol and user_clubs.sol to incorporate the attributes, functions, and policies of loyalty_programs.sol and user_clubs.sol, respectively, into a particular access right. The user can then compile loyalty_programs.sol and user_clubs.sol, which will compose the access right, store a template identifier associated with loyalty_programs.sol and user_clubs.sol as the attributes for the access right in template database 1430, and push the generated smart contract to Blockchain system 1150. Access right configuration system 1420 can be configured to run a validation process to verify that the access right can be transferred and revoked (and that the access rights are compatible with legacy systems).

Once the access right validated, the access right is stored as a template in template database 1430, which stores the result of the compilation. For example, the result of the compilation may be an ABI file (e.g., a JavaScript interface file) and byte code, such as the machine language that the Ethereum virtual machine can run, that represents the compiled Solidity files. Access right generator 1440 can provide an interface that enables a user to create a new access right by assigning a template from the template database 1430 to the new access right. When the new access right is created, the access right configuration system 1420 can retrieve the ABI file and the byte code associated with the selected template. In some implementations, registry 1460 can include a data structure that stores an identifier for each smart contract that is published to the Blockchain system 1150 and an identifier of the corresponding ABI code and byte code for each smart contract. Further, access right generator 1440 enables an access right designer to select from amongst any number of templates based on the desired configurations of access rights for a particular resource. The new access right is the smart contract that is published to the public ledger of the Blockchain system 1150.

In some implementations, the smart contracts (e.g., the composed access rights) are posted to Blockchain system 1150 (e.g., published on the public ledger stored on a Blockchain node included in Blockchain system 1150). Additionally, as described above, registry 1460 may track the state of each smart contract and/or may indicate the ABI file and byte code that is associated with each smart contract. Later, when the primary load management system receives an instruction relating to that smart contract (e.g., to execute a transaction to transfer the smart contract from one user to another user), the primary load management system can automatically associate the smart contract with the underlying template and retrieve all of the extended functionality by accessing the ABI file and byte code identifiers from registry 1460 and retrieving the actual ABI file and byte code from template database 1430.

In some implementations, once the smart contracts are stored on the Blockchain system 1150, access can be granted to external system 1450 (e.g., third-party systems) to directly access the access rights through the Blockchain system 1150. By granted secure access to certain authorized external system 1450, the external system 1450 can perform operations directly onto Blockchain system 1150, and those operations will be written back into application data stores using an event listener to maintain synchronization. As a result, the distributed nature of the public ledger can be exposed and other participants can gain equal ability to generate and access rights on Blockchain system 1150. Further, an administrative panel can be provided to operators of the primary load management system to manage all aspects of the access rights created by any external system 1450.

Advantageously, the present disclosure describes an easy drag-and-drop process for composing a smart contract to serve as an access right to a resource. The system described herein can fit within a canonical representation application level, while also configuring each access right to be compatible with legacy systems (through the use of the core Solidity file in each access right). Additionally, the authorized access granted to external system 1450 provides a secure, special private access channel for third-party partners that can create encrypted requests to Blockchain system 1150. In some implementations, external system 1450 do not require traditional API to access Blockchain system 1150 or access right generation system 1170.

Figure 15:
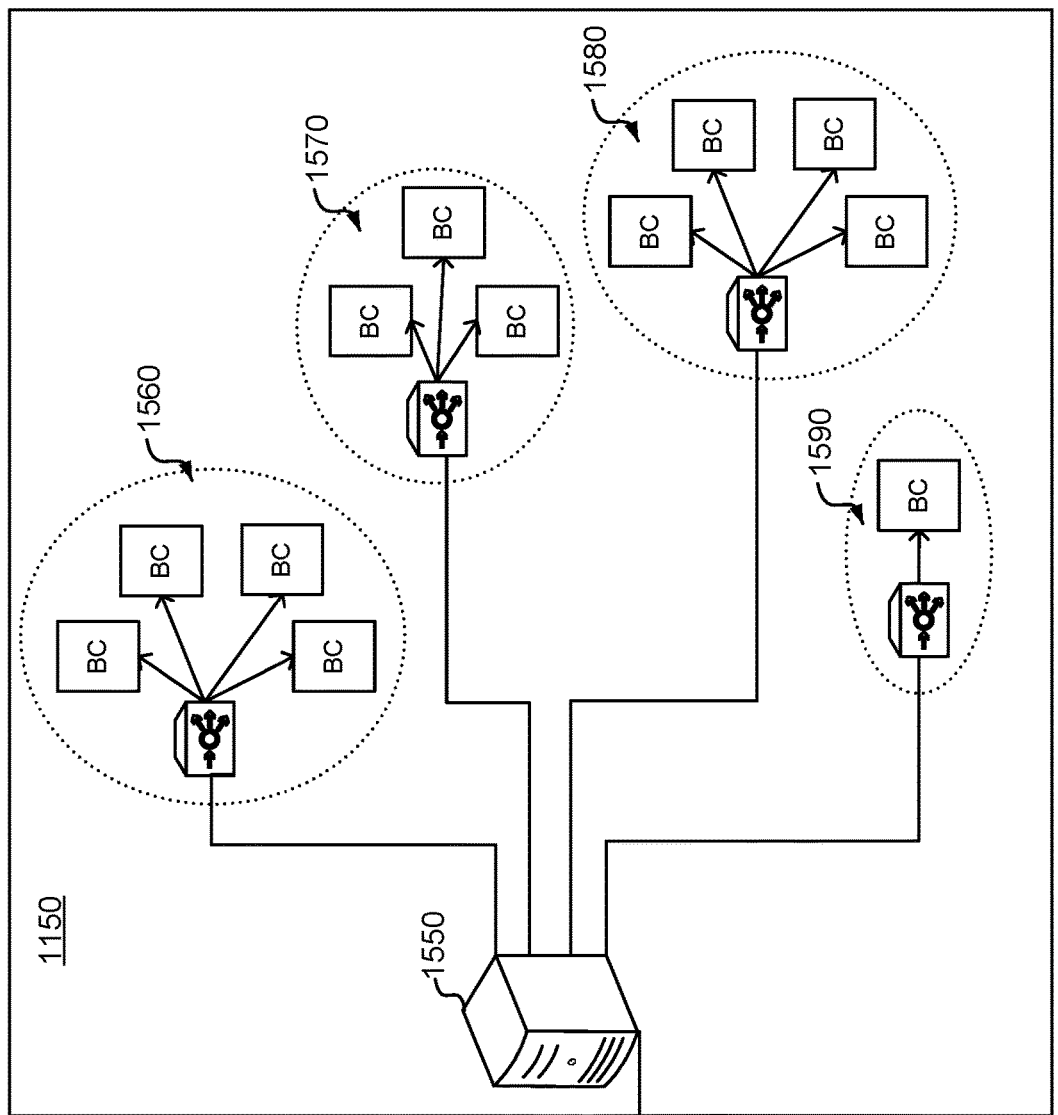
FIG. 15 is a block diagram illustrating an example network environment for clustering Blockchain servers, according to aspects of the present disclosure.
Figure 15:
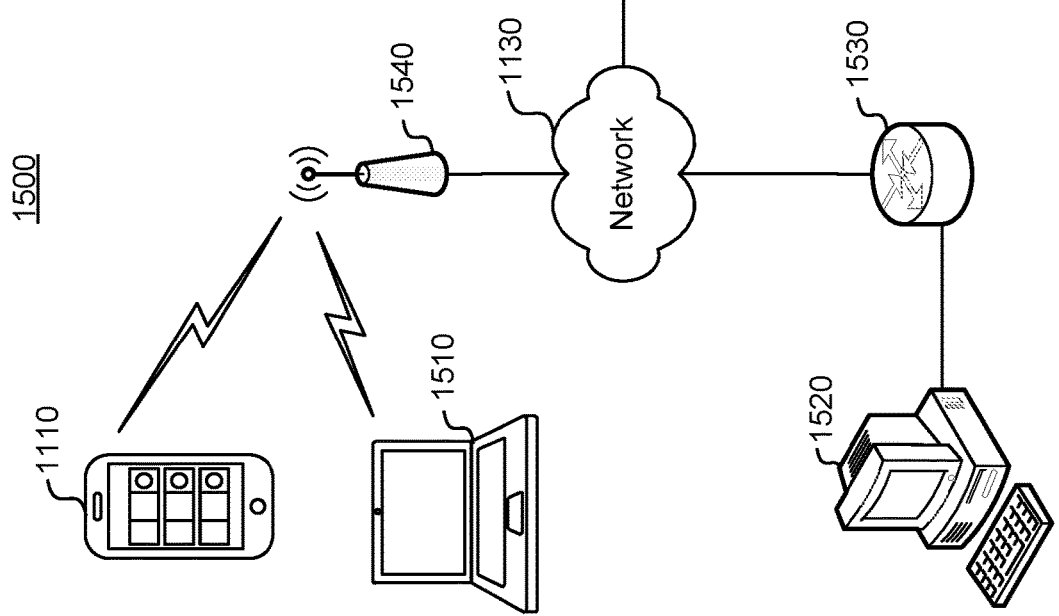

FIG. 15 is a block diagram illustrating network environment 1500 for clustering Blockchain servers to enhance the scalability of access right processing. Scalability is a significant technical challenge in Blockchain technology. For example, there is still a need to reliably distribute a data load across multiple Blockchain nodes to ensure maximum performance. According to certain embodiments, network environment 1500 enables the creation of Blockchain clusters of varying sizes to intelligently scale upwards during high-volume resources. As will be described in greater detail below, Blockchain clusters can have varying levels of computing power to simultaneously facilitate access right processing for small and high-demand resources.

FIG. 15 illustrates that network environment 1500 includes user device 1110, user device 1510, and user device 1520. It will be appreciated that network environment 1500 can include any number and type of user devices. User device 1110 and user device 1510 can communicate with Blockchain system 1150 through gateway 1540 and network 1130; and user device 1520 can communicate with Blockchain system 1150 through router 1530. In some implementations, Blockchain system 1150 can include cluster provisioning server 1550 to provision one or more Blockchains or one or more clusters of Blockchains.

The Blockchain-based system can implement certain embodiments described herein to scale up the potential processing load to meet the high-volume of access right requests that will be processed. Cluster provisioning server 1550 can identify the four resources that will occur (e.g., by retrieving information from a calendar stored in the primary load management system). Using the retrieved resource information indicating that the four resources will occur on the same weekend, cluster provisioning server can provision four clusters of Blockchains to automatically scale up the data load that can be processed by the Blockchain system 1150. In this example, cluster provisioning server 1550 can automatically provision Blockchain cluster 1560 (comprising four Blockchain nodes), Blockchain cluster 1570 (comprising three Blockchain nodes), Blockchain cluster 1580 (comprising four Blockchain nodes), and Blockchain cluster 1590 (comprising one Blockchain node). Each cluster may represent a logical collection of independent Blockchains that are indexed in a cluster map. Each Blockchain and/or each cluster of Blockchains may be defined by a unique identifier. In some implementations, the unique identifier may be a hybrid of the cluster identifier and the Blockchain identifier within that cluster. Each discrete Blockchain can be a composite system of n nodes that operates independently from one another. The logical representation of the Blockchains may be organized into clusters. The cluster may represent an organizational unit that supports a series of access right requests. The larger the expected audience for the resource, the greater the number of Blockchains in a cluster.

Cluster provisioning server 1550 can determine how many Blockchain nodes to include in a cluster based on user-defined or machine-learning-based rules. For example, machine-learning-based rules may be rules that are identified or determined as a result of applying one or more machine-learning algorithms to a dataset of historical information. The historical information may include the size of resources, the magnitude and timing of peak loads for those resources, and other suitable historical information relating to resources.

In some implementations, when an access right request for a smart contract is received at Blockchain system 1150, cluster provisional server 1550 can intelligently assign the access right request to a Blockchain cluster. For example, cluster provisioning server 1550 may evaluate a first access right request and determine (from the metadata associated with the first access right request) that the second access right request is a request for the concert of the major performer. Cluster provisioning server 1550 may then intelligently assign the first access right request to Blockchain cluster 1560, which has a sufficient number of Blockchain servers to handle a large resource by the major performer. Then, cluster provisioning server 1550 may evaluate a second access right request and determine (again, based on the metadata associated with the second access right request) that the second access right request is a request for the performance by the local artist at the local coffee shop. Cluster provisioning server 1550 may then intelligently assign the second access right request to Blockchain cluster 1590, which includes a single Blockchain server. In this case, a single Blockchain server may be sufficient to handle the access right requests for a local artist performing at a local coffee shop. Further, cluster provisioning server 1550 may receive a third access right request and determine (based on the metadata associated with the third access right request) that the third access right request is a request for an access right to popular author who is speaking at a nearby auditorium. Based on this information, cluster provisioning server 1550 can automatically and intelligently assign the third access right request to Blockchain cluster 1570, which includes a sufficient number of Blockchain servers to execute the smart contract associated with the third access right request. Lastly, in this example, cluster provisioning server 1550 can receive a fourth access right request for the final championship game. Cluster provisioning server 1550 can evaluate the metadata associated with the fourth access right request and determine that the fourth access right request should be routed to Blockchain cluster 1580, which includes a sufficient number of Blockchain servers to process the high-load associated with a large resource like the final championship game.

In some implementations, the workload associated with access right requests is evenly assigned to Blockchain clusters. For example, to perform an even assignment of workload, the cluster provisioning server 1550 performs at least three actions: Blockchain provisioning, cluster assignment, and request routing (described in greater detail below in the description of FIG. 16).

Figure 16:
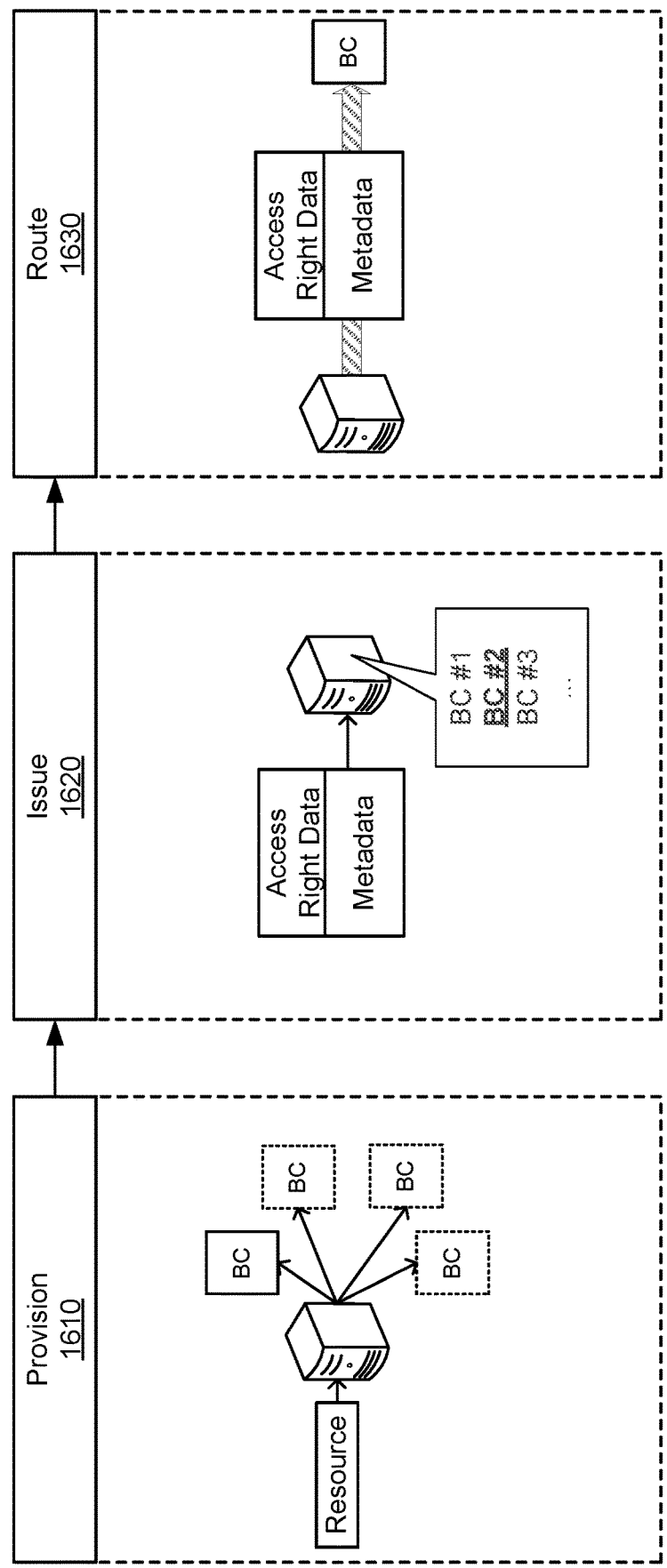
FIG. 16 is a flow diagram illustrating an example process for scaling a Blockchain-based system, according to aspects of the present disclosure.

FIG. 16 is a flow diagram illustrating process 1600 for scaling a Blockchain-based system. Process 1600 begins with block 1610 where the cluster provisioning server provisions one or more Blockchains. In some implementations, cluster provisioning server can retrieve resource data representing or characterizing the resource. Then, the cluster provisioning server can provision the number of Blockchain instances to satisfy the demand forecasted by the resource data. Provisioning an instance of a Blockchain may include creating repeatable (self-contained) instances of Blockchains across which the access right requests can be distributed. For example, the configuration of a Blockchain (e.g., single-node, multi-node, etc.) can be abstracted in the Blockchain system. Further, to support capacity planning and management of the provisioned Blockchains, the Blockchain system can employ a network of Blockchain clusters, to which the distribution of the access right contracts can be intelligently assigned. Each cluster can represent a logical collection of independent Blockchains that are indexed in a cluster map and is defined by a unique identifier (e.g., the identifier may be a hybrid of the cluster identifier and the Blockchain identifier within that cluster). In some implementations, creating new private/consortium Blockchains should not be a dramatically difficult process using a hosted service. In some implementations, consistent Amazon Machine Images (AMIs), likely with Docker images, can be deployed and managed with a common genesis identifier so that public/private key pairs can be consistent across all Blockchains.

Next, at block 1620, process 1600 may include the issuing step. For example, issuing may include assigning an incoming access right request to a Blockchain cluster. In some implementations, once the Blockchains are provisioned, an algorithm can defined to determine how to assign incoming access right requests. In some implementations, each resource may have an associated Blockchain cluster, where the initial access right request can routed. At that point, a specific Blockchain from the Blockchain cluster can be assigned, for example, based on a round robin and/or the number of smart contracts that are currently on the Blockchain or in the Blockchain cluster. In some implementations, the selection of a Blockchain cluster or the selection of a Blockchain within the Blockchain cluster can also be performed manually or based on user defined rules.

In some implementations, the rules executed for intelligently issuing or assigning the access right requests may be determined based on one or more machine-learning techniques. For example, the cluster provisioning server can then use one or more machine-learning techniques and/or artificial intelligence techniques to evaluate the metadata of each incoming access right request to identify patterns between the historical cluster assignment and processing times of the access right requests. The machine-learning techniques may include, for example, one or more machine-learning algorithms, such as an ensemble of multi-label classifiers (e.g., supervised or unsupervised learning), artificial neural networks (including backpropagation, Boltzmann machines, etc.), Bayesian statistics (e.g., Bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised, semi-supervised, or unsupervised). The detected patterns can be used to define a new rule used by the cluster provisioning server to intelligently assign access right requests to Blockchain clusters or to Blockchains within clusters. Each assignment of an access right request to a Blockchain cluster and/or to a Blockchain within a cluster can be logged in the cluster map. Lastly, at step 1630, the cluster provisioning server can route the access right request to the selected Blockchain and/or Blockchain cluster. It will be appreciated that the intelligent assignment of certain access right requests may bias assignment to certain Blockchains within a Blockchain cluster so as to improve processing performance for access right requests. For example, certain Blockchains within a cluster may perform better than other Blockchains within the same cluster. Accordingly, for access right requests, for example, from VIP members, the cluster provisioning server can bias the assignment to the better performing Blockchains within a given cluster.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

I claim:

1. A method for reordering a digital queue of requests, for access rights to access a resource for entry to a live event, to be transmitted in a Blockchain system, the method comprising:
    receiving a first access-right request, to access the resource, from a first user device, wherein first metadata of the first access-right request includes a plurality of first items;
    receiving a second access-right request, to access the resource, from a second user device, wherein second metadata of the second access-right request includes a plurality of second items;
    adding, in the digital queue, each of the first access-right request and the second access-right request, wherein the digital queue is stored in a Blockchain buffer;
    determining a set of prioritization rules based on a sequential first-in-first out (FIFO) analysis on the first access-right request and the second access-right request;
    assigning a numerical value, based on the set of prioritization rules, to:
        each of the plurality of first items of the first metadata, and
        each of the plurality of second items of the second metadata;
    generating a first priority score of the first access-right request based on the numerical value of each of the plurality of first items of the first metadata;
    generating a second priority score of the second access-right request based on the numerical value of each of the plurality of second items of the second metadata;
    reordering queue positions of the first access-right request and the second access-right request in the digital queue, based on the first priority score and the second priority score, wherein the queue positions of the first access-right request and the second access-right request are reordered to generate a reordered digital queue; and
    transmitting, to the Blockchain system, queue information of the reordered digital queue in association with the first access-right request and the second access-right request.

2. The method of claim 1, wherein the Blockchain system executes a process of assignment of a first access right to the first user device and assignment of a second access right to the second user device, based on the reordered digital queue.

3. The method of claim 1, further comprising:
    receiving a third access-right request, to access the resource, from the first user device;
    storing, in a deferral buffer, the third access-right request based on a processing operation on the first access-right request by the Blockchain system; and
    transmitting the third access-right request to the Blockchain system based on a result of the processing operation on the first access-right request.

4. The method of claim 1, further comprising transmitting, to the Blockchain system, the second access-right request before the first access-right request based on the second priority score being higher than the second priority score.

5. The method of claim 1, further comprising:
    generating the first priority score based on weighted combination of numerical values of the plurality of first items of the first metadata; and
    generating the second priority score based on a weighted combination of numerical values of the plurality of second items of the second metadata.

6. The method of claim 1, further comprising:
    receiving, from the first user device, a first transfer request to transfer a first access right to a third user device at a first time instant, wherein the first access right is assigned to the first user device in response to the first access-right request;
    receiving, from the first user device, a second transfer request to transfer the first access right to a fourth user device at a second time instant; and
    storing the first transfer request in the Blockchain buffer and the second transfer request in a deferral buffer based on the first time instant is before the second time instant.

7. The method of claim 6, wherein the second transfer request is processed by the Blockchain system after the first transfer request based on the first transfer request is stored in the Blockchain buffer and the second transfer request is stored in the deferral buffer.

8. The method of claim 7, wherein the Blockchain system:
    assigns a second access right corresponding to the first access right to the third user device based on processing of the first transfer request; and
    returns a denial response for the fourth user device based on the second access right assigned to the third user device.

9. A system for reordering a digital queue of requests, for access rights to access a resource for entry to a live event, to be transmitted in a Blockchain system, the system comprising:

one or more processors, connected with one or more memory, configured to:
  receive a first access-right request, to access the resource, from a first user device, wherein first metadata of the first access-right request includes a plurality of first items;
  receive a second access-right request, to access the resource, from a second user device, wherein second metadata of the second access-right request includes a plurality of second items;
  add, in the digital queue, each of the first access-right request and the second access-right request, wherein the digital queue is stored in a Blockchain buffer;
  determine a set of prioritization rules based on a sequential first-in-first out (FIFO) analysis on the first access-right request and the second access-right request;
  assign a numerical value, based on the set of prioritization rules, to: each of the plurality of first items of the first metadata, and each of the plurality of second items of the second metadata;
  generate a first priority score of the first access-right request based on the numerical value of each of the plurality of first items of the first metadata;
  generate a second priority score of the second access-right request based on the numerical value of each of the plurality of second items of the second metadata;
  reorder queue positions of the first access-right request and the second access- right request in the digital queue, based on the first priority score and the second priority score, wherein the queue positions of the first access-right request and the second access- right request are reordered to generate a reordered digital queue; and
  transmit, to the Blockchain system, queue information of the reordered digital queue in association with the first access-right request and the second access-right request.

10. The system of claim 9, wherein the Blockchain system executes assignment of a first access right to the first user device and assignment of a second access right to the second user device, based on the reordered digital queue.

11. The system of claim 9, wherein the one or more processors are further configured to:
  receive a third access-right request, to access the resource, from the first user device;
  store, in a deferral buffer, the third access-right request based on a processing operation on the first access-right request by the Blockchain system; and
  transmit the third access-right request to the Blockchain system based on a result of the processing operation on the first access-right request.

12. The system of claim 9, wherein the one or more processors are further configured to transmit, to the Blockchain system, the second access-right request before the first access-right request based on the second priority score being higher than the second priority score.

13. The system of claim 9, wherein the one or more processors are further configured to:
  generate the first priority score based on weighted combination of numerical values of the plurality of first items of the first metadata; and
  generate the second priority score based on a weighted combination of numerical values of the plurality of second items of the second metadata.

14. The system of claim 9, wherein the one or more processors are further configured to:
  receive, from the first user device, a first transfer request to transfer a first access right to a third user device at a first time instant, wherein the first access right is assigned to the first user device in response to the first access-right request;
  receive, from the first user device, a second transfer request to transfer the first access right to a fourth user device at a second time instant; and
  store the first transfer request in the Blockchain buffer and the second transfer request in a deferral buffer based on the first time instant is before the second time instant.

15. The system of claim 14, wherein the second transfer request is processed by the Blockchain system after the first transfer request based on the first transfer request is stored in the Blockchain buffer and the second transfer request is stored in the deferral buffer.

16. The system of claim 15, wherein the Blockchain system:
  assigns a second access right corresponding to the first access right to the third user device based on the first transfer request; and
  returns a denial response for the fourth user device based on the second access right assigned to the third user device.

17. A non-transitory computer-readable medium comprising instructions that are executable by a processing apparatus to cause the processing apparatus to perform operations for reordering a digital queue of requests, for access rights to access a resource for entry to a live event, to be transmitted in a Blockchain system, the operations comprising:
  receiving a first access-right request, to access the resource, from a first user device, wherein first metadata of the first access-right request includes a plurality of first items;
  receiving a second access-right request, to access the resource, from a second user device, wherein second metadata of the second access-right request includes a plurality of second items;
  adding, in the digital queue, each of the first access-right request and the second access- right request, wherein the digital queue is stored in a Blockchain buffer;
  determining a set of prioritization rules based on a sequential first-in-first out (FIFO) analysis on the first access-right request and the second access-right request;
  assigning a numerical value, based on the set of prioritization rules, to:
    each of the plurality of first items of the first metadata, and
    each of the plurality of second items of the second metadata;
  generating a first priority score of the first access-right request based on the numerical value of each of the plurality of first items of the first metadata;
  generating a second priority score of the second access-right request based on the numerical value of each of the plurality of second items of the second metadata;
  reordering queue positions of the first access-right request and the second access-right request in the digital queue, based on the first priority score and the second priority score, wherein the queue positions of the first access-right request and the second access-right request are reordered to generate a reordered digital queue; and transmitting, to the Blockchain system, queue information of the reordered digital queue in association with the first access-right request and the second access-right request.

18. The non-transitory computer-readable medium of claim 17, wherein the Blockchain system executes a process of assignment of a first access right to the first user device and assignment of a second access right to the second user device, based on the reordered digital queue.

19. The non-transitory computer-readable medium of claim 17, further comprising:
  receiving a third access-right request, to access the resource, from the first user device;
  storing, in a deferral buffer, the third access-right request based on a processing operation on the first access-right request by the Blockchain system; and
  transmitting the third access-right request to the Blockchain system based on a result of the processing operation on the first access-right request.

20. The non-transitory computer-readable medium of claim 17, further comprising transmitting, to the Blockchain system, the second access-right request before the first access-right request based on the second priority score being higher than the second priority score.

* * * * *